United States Patent
Tong et al.

(10) Patent No.: US 12,556,055 B2
(45) Date of Patent: Feb. 17, 2026

(54) ELECTRICAL INTERCONNECTOR AND MOTOR INCLUDING THE SAME

(71) Applicant: TECHTRONIC CORDLESS GP, Anderson, SC (US)

(72) Inventors: Wei Tong, Greenville, SC (US); Jarrett Dunston, Greenville, SC (US); Dale London, Hendersonville, NC (US)

(73) Assignee: Techtronic Cordless GP, Anderson, SC (US)

( * ) Notice: Subject to any disclaimer, the term of this patent is extended or adjusted under 35 U.S.C. 154(b) by 300 days.

(21) Appl. No.: 18/156,303

(22) Filed: Jan. 18, 2023

(65) Prior Publication Data
US 2023/0238850 A1   Jul. 27, 2023

Related U.S. Application Data

(60) Provisional application No. 63/302,315, filed on Jan. 24, 2022.

(51) Int. Cl.
*H02K 3/52* (2006.01)
*H01R 12/67* (2011.01)
*H01R 12/70* (2011.01)

(52) U.S. Cl.
CPC ......... *H02K 3/522* (2013.01); *H02K 2203/03* (2013.01)

(58) Field of Classification Search
CPC .......... H02K 3/52; H02K 3/522; H02K 3/521; H02K 11/33; H02K 11/30; H02K 15/32;
(Continued)

(56) References Cited

U.S. PATENT DOCUMENTS 4,130,331 A    12/1978  Neff et al.
4,230,391 A *  10/1980  Keglewitsch ........ H01R 4/2425
                                                439/395
(Continued)

FOREIGN PATENT DOCUMENTS

CN    103023262 A      4/2013
CN    205811684 U  *  12/2016
(Continued)

OTHER PUBLICATIONS

US 10,848,032 B2, 11/2020, Doan et al. (withdrawn)
Extended European Search Report for Application No. 23152235.0 dated Oct. 18, 2023 (12 pages).

*Primary Examiner* — Edgardo San Martin
(74) *Attorney, Agent, or Firm* — Michael Best & Friedrich LLP

(57) ABSTRACT

A stator of an electrical machine including stator windings, a stator insulator, connectors, and a printed circuit board. Each of the stator windings is wound by magnet wire on a stator lamination core such that the stator has a plurality of magnet wires. The stator insulator is formed of an insulative material and has a ring structure and connector receivers. The connectors include legs such that the legs of each connector are coupled to a corresponding one of the connector receivers by snap-fit engagement. Each of the connectors electrically connects to single or multiple magnet wires. The printed circuit board is coupled to an input power line and is electrically connected to each of the connectors such that the printed circuit board is electrically connected to the magnet wire of each of the stator windings.

20 Claims, 21 Drawing Sheets

(58) Field of Classification Search
CPC .............. H02K 15/33; H02K 2203/03; H02K 2203/09; H02K 2203/00; H01R 4/2429; H01R 4/2425; H01R 4/2416; H01R 4/24; H01R 12/59; H01R 12/62; H01R 12/65; H01R 12/67; H01R 12/675; H01R 12/68; H01R 12/69; H01R 12/70; H01R 12/7011; H01R 12/7017; H01R 12/7064; H01R 2201/10

See application file for complete search history.

(56) References Cited

U.S. PATENT DOCUMENTS

| | | | |
|---|---|---|---|
| 4,287,446 A | 9/1981 | Lill et al. | |
| 4,322,647 A | 3/1982 | Neroda et al. | |
| 4,557,544 A | 12/1985 | Esser | |
| 4,584,498 A | 4/1986 | Strobl | |
| 4,656,378 A | 4/1987 | Atherton et al. | |
| 4,656,380 A | 4/1987 | Strobl | |
| 4,764,700 A | 8/1988 | Strobl | |
| 4,769,627 A | 9/1988 | Baines | |
| 4,851,730 A | 7/1989 | Fushiya et al. | |
| 4,876,474 A | 10/1989 | Wang et al. | |
| 4,881,000 A | 11/1989 | Wang | |
| 4,927,379 A | 5/1990 | Wang et al. | |
| 4,930,210 A | 6/1990 | Wang | |
| 4,983,871 A | 1/1991 | Strobl | |
| 5,015,894 A | 5/1991 | Crow et al. | |
| 5,229,674 A | 7/1993 | Best | |
| 5,373,209 A | 12/1994 | Strobl et al. | |
| 5,679,996 A | 10/1997 | Strobl | |
| 5,895,994 A * | 4/1999 | Molnar | H02K 3/50 310/410 |
| 5,975,937 A * | 11/1999 | Boischio | H02K 5/225 439/404 |
| 6,030,260 A | 2/2000 | Kikuchi et al. | |
| 6,445,097 B1 | 9/2002 | Zeiler et al. | |
| 6,701,604 B2 | 3/2004 | Zeiler et al. | |
| 6,800,973 B2 * | 10/2004 | Futami | H01R 4/2458 310/71 |
| 6,927,512 B2 | 8/2005 | Zeiler et al. | |
| 7,109,618 B2 | 9/2006 | Cha | |
| 7,484,992 B2 * | 2/2009 | Boischio | H02K 5/225 310/71 |
| 8,035,263 B2 | 10/2011 | Kienzler et al. | |
| 8,143,752 B2 * | 3/2012 | Altindis | H02K 3/522 310/71 |
| 8,193,677 B2 | 6/2012 | Murakami et al. | |
| 8,421,282 B2 | 4/2013 | Ota | |
| 8,492,948 B2 | 7/2013 | Wang et al. | |
| 8,901,797 B2 * | 12/2014 | Castle | H02K 3/522 310/179 |
| 8,963,389 B2 | 2/2015 | Kim | |
| 9,178,397 B2 | 11/2015 | Furuhashi et al. | |
| 9,325,213 B2 | 4/2016 | Egami | |
| 9,490,677 B2 | 11/2016 | Jo | |
| 9,608,488 B2 | 3/2017 | Koch et al. | |
| 9,819,241 B2 | 11/2017 | Smith et al. | |
| 9,948,162 B2 | 4/2018 | Nagahama et al. | |
| 10,056,806 B2 | 8/2018 | Hatfield et al. | |
| 10,158,268 B2 | 12/2018 | Fujii et al. | |
| 10,177,628 B2 | 1/2019 | Laber et al. | |
| 10,205,363 B2 * | 2/2019 | Li | H02K 3/522 |
| 10,205,365 B2 | 2/2019 | Beyerl et al. | |
| 10,432,065 B2 | 10/2019 | Beyerl et al. | |
| 10,468,930 B2 | 11/2019 | Dawson et al. | |
| 10,523,080 B2 | 12/2019 | Smith et al. | |
| 10,523,081 B2 | 12/2019 | Smith et al. | |
| 10,608,500 B2 | 3/2020 | Nagahama | |
| 10,673,305 B2 | 6/2020 | Beyerl et al. | |
| 10,720,822 B2 | 7/2020 | Niwa | |
| 10,749,405 B2 | 8/2020 | Nagahama | |
| 10,848,042 B2 | 11/2020 | Beyerl et al. | |
| 10,903,718 B2 | 1/2021 | Nagahama et al. | |
| 10,931,167 B2 | 2/2021 | Beyerl et al. | |
| 10,944,193 B2 | 3/2021 | Meynier et al. | |
| 11,114,927 B2 | 9/2021 | Beyerl et al. | |
| 11,128,194 B2 | 9/2021 | Smith et al. | |
| 11,133,720 B2 | 9/2021 | Smith et al. | |
| 11,139,712 B2 | 10/2021 | Yamamoto et al. | |
| 11,211,846 B2 | 12/2021 | Niwa et al. | |
| 11,283,325 B2 | 3/2022 | Smith et al. | |
| 11,374,528 B2 | 6/2022 | Sheeks et al. | |
| 11,496,022 B2 | 11/2022 | Beyerl et al. | |
| 11,682,954 B2 * | 6/2023 | Ji | H02K 15/095 310/179 |
| 2013/0342041 A1 | 12/2013 | Ayers et al. | |
| 2016/0149467 A1 | 5/2016 | Smith et al. | |
| 2017/0310191 A1 | 10/2017 | Mezger et al. | |
| 2018/0034346 A1 | 2/2018 | Purohit et al. | |
| 2018/0233988 A1 | 8/2018 | Ishida et al. | |
| 2018/0233989 A1 | 8/2018 | Ishida | |
| 2018/0323681 A1 | 11/2018 | Hatfield et al. | |
| 2019/0001452 A1 | 1/2019 | Nagahama | |
| 2019/0006980 A1 | 1/2019 | Sheeks et al. | |
| 2020/0091793 A1 | 3/2020 | Smith et al. | |
| 2020/0106380 A1 | 4/2020 | Sheeks et al. | |
| 2020/0177047 A1 | 6/2020 | Kutsuna | |
| 2021/0187707 A1 | 6/2021 | Smith et al. | |
| 2021/0194319 A1 | 6/2021 | Smith et al. | |
| 2021/0242731 A1 | 8/2021 | Beyerl et al. | |
| 2021/0296955 A1 | 9/2021 | Yamada et al. | |
| 2021/0315101 A1 | 10/2021 | Zucca | |
| 2021/0328482 A1 | 10/2021 | Rutowski et al. | |
| 2021/0384793 A1 | 12/2021 | Bailey et al. | |
| 2021/0384809 A1 | 12/2021 | Beyerl et al. | |
| 2022/0014066 A1 | 1/2022 | Smith et al. | |
| 2022/0077748 A1 | 3/2022 | Niwa et al. | |
| 2022/0158517 A1 | 5/2022 | Smith et al. | |
| 2022/0158518 A1 | 5/2022 | Smith et al. | |
| 2022/0166283 A1 | 5/2022 | Smith et al. | |
| 2022/0200389 A1 | 6/2022 | Meng et al. | |
| 2022/0224191 A1 * | 7/2022 | Guardiola | H02K 3/28 |
| 2022/0247251 A1 | 8/2022 | Jefferies et al. | |
| 2022/0320939 A1 | 10/2022 | Naito | |
| 2022/0320960 A1 | 10/2022 | Hatfield et al. | |
| 2022/0337121 A1 | 10/2022 | Niwa | |

FOREIGN PATENT DOCUMENTS

| | | | |
|---|---|---|---|
| CN | 105449884 B | 8/2018 | |
| CN | 212627376 U | 2/2021 | |
| CN | 109586483 B | 3/2021 | |
| CN | 110126181 B | 3/2021 | |
| CN | 109586431 B | 10/2021 | |
| DE | 102011116077 A1 | 4/2013 | |
| DE | 102013205913 A1 | 10/2014 | |
| DE | 102013114688 A1 * | 6/2015 | .............. H02K 3/50 |
| DE | 102017202860 A1 | 8/2017 | |
| DE | 102016206657 A1 * | 10/2017 | ............. H02K 15/00 |
| DE | 102016211230 A1 | 12/2017 | |
| DE | 202018100413 U1 | 2/2018 | |
| DE | 102016121856 A1 * | 5/2018 | |
| DE | 102018102976 A1 * | 8/2019 | ............. H02K 1/185 |
| DE | 102018221040 A1 * | 6/2020 | |
| DE | 102021214766 A1 * | 6/2023 | .............. H02K 3/28 |
| EP | 3312977 A2 | 4/2018 | |
| EP | 3428004 A1 | 1/2019 | |
| JP | 2018182249 A | 11/2018 | |
| WO | WO2016177366 A1 | 11/2016 | |
| WO | WO2017122766 A1 | 7/2017 | |
| WO | WO2018150964 A1 | 8/2018 | |
| WO | WO2019044393 A1 | 3/2019 | |
| WO | 2022010123 A1 | 1/2022 | |

* cited by examiner

ELECTRICAL INTERCONNECTOR AND MOTOR INCLUDING THE SAME

CROSS-REFERENCE TO RELATED APPLICATION

This application claims priority to U.S. Provisional Patent Application 63/302,315 filed on Jan. 24, 2022, the entire contents of which are incorporated herein by reference.

FIELD OF THE INVENTION

The present invention relates to an electrical connector, and more particularly to an electrical connector for electrical machines such as motors.

BACKGROUND OF THE INVENTION

In brushless rotary motors, the rotor typically includes permanent magnets that are placed on the rotor surface or inserted into the rotor core. These permanent magnets are usually positioned in the motor axial direction to define magnet poles. There are gaps between each pole to minimize the magnetic flux leakage between adjacent magnets. A stator core is constructed by stacking laminated silicone steel with either a single-piece structure or a segmented structure. For the stator with a segmented structure, the winding of magnet wires is wrapped on each segment to enhance the slot filling rate. A stator insulator is coupled to the stator core to electrically insulate the stator core and the stator winding coils. A controller controls the operation of the motor.

Electrical connectors are often used to make electrical connections between the motor and a power source and/or controller. Some existing motors include press-in connectors (e.g., a press-in connector as described in U.S. Pat. No. 10,468,930). These types of connectors primarily rely on friction between the connector and associated stator insulator for retention and may be prone to risk of separation during operation of the motor, which causes an undesirable electrical disconnection.

SUMMARY

In one aspect, the disclosure provides a stator of an electrical machine including stator windings, a stator insulator, electrical connectors, and a printed circuit board. Each of the stator windings is wound by magnet wire on a stator lamination core such that the stator has a plurality of magnet wires. The stator insulator is formed of an insulative material and includes a ring structure and connector receivers. The electrical connectors include legs such that each electrical connector is coupled to a corresponding one of the connector receivers by snap-fit engagement between the legs and the corresponding one of the connector receivers. Each of the electrical connectors is configured to receive and electrically connect to one of the magnet wires of the plurality of magnet wires. The printed circuit board is coupled to an input power line and is electrically connected to each of the electrical connectors such that the printed circuit board is electrically connected to the magnet wire of each of the stator windings.

In another aspect, the disclosure provides an electrical connector for an electrical machine. The electrical connector includes a body, a median portion, a first portion, and a second portion. The body includes a first end and a second end opposite the first end. An axis extends longitudinally between the first end and the second end. The median portion is located between the first end and the second end. The first portion includes first legs that extend along the axis from the median portion toward the first end. The first legs are configured to electrically to a magnet wire of the electrical machine. The second portion includes second legs extending along the axis from the median portion toward the second end. The second legs are configured to electrically connect to a printed circuit board of the electrical machine.

In another aspect, the disclosure provides a reliable and cost-effective method of assembling an electrical machine. The electrical machine includes stator windings, a stator insulator, electrical connectors, and a printed circuit board. The stator insulator is formed of an insulative material and includes a ring structure and connector receivers. The method includes coupling each of the electrical connectors to a corresponding one of the connector receivers by inserting legs of each of the electrical connectors into slots defined by the connector receivers. The legs of each of the electrical connectors extends along an axis. Prior to full insertion into the connector receivers, the legs of the electrical connectors flex toward the axis. On full insertion into the connector receivers, the legs of the electrical connectors flex away from the axis and are secured in snap-fit engagement with the connector receivers.

Other aspects of the invention will become apparent by consideration of the detailed description and accompanying drawings.

DETAILED DESCRIPTION

Figure 1A:
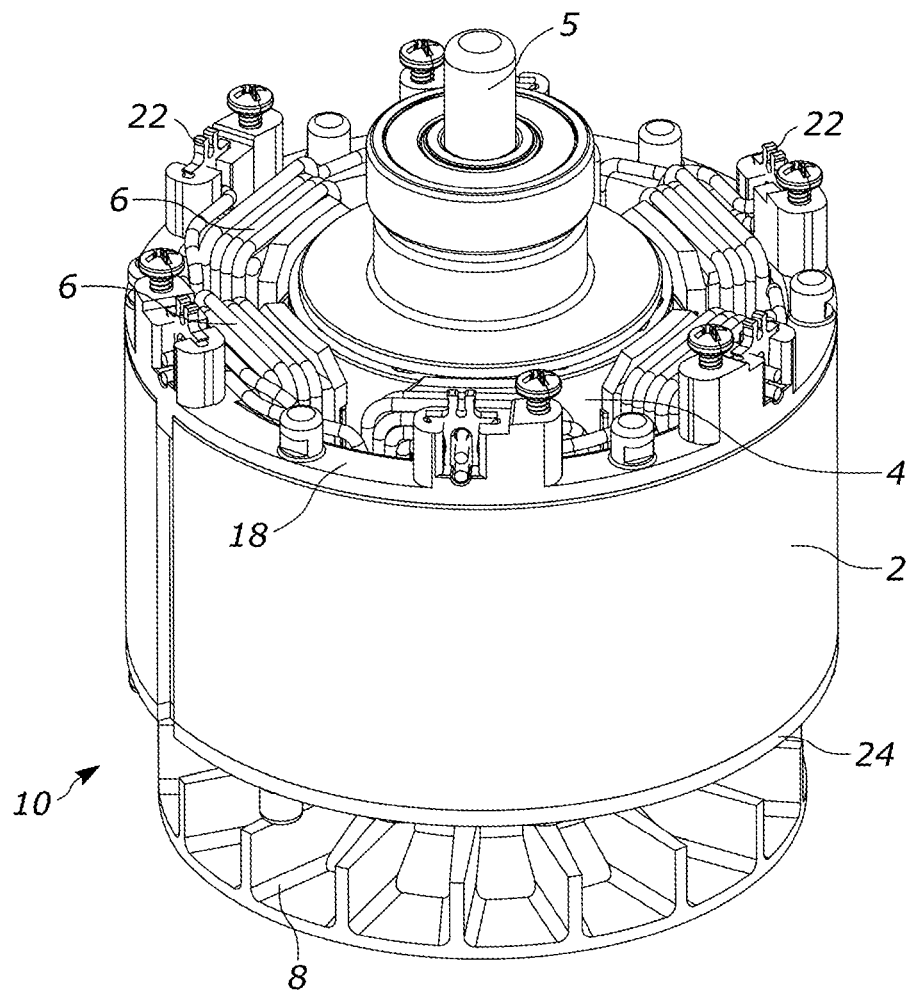
FIG. 1A is a perspective view of an electrical machine in accordance with an exemplary embodiment of the disclosure.

Before any embodiments of the disclosed technology are explained in detail, it is to be understood that the technology is not limited in its application to the details of construction and the arrangement of components set forth in the following description or illustrated in the following drawings. The technology is capable of other embodiments and of being practiced or of being carried out in various ways. Also, it is to be understood that the phraseology and terminology used herein is for the purpose of description and should not be regarded as limiting. Any implementation described herein as "exemplary" is not necessarily to be construed as preferred or advantageous over other implementations. The detailed description uses numerical and letter designations to refer to features in the drawings. Like or similar designations in the drawings and description have been used to refer to like or similar parts of the embodiments of the technology.

As used herein, the terms "first", "second", and "third" may be used interchangeably to distinguish one component from another and are not intended to signify location or importance of the individual components, unless otherwise context dictates otherwise. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive- or. For example, a condition A or B is satisfied by any one of the following: A is true (or present) and B is false (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction (e.g., clockwise or counter-clockwise).

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The term "snap-fit" may refer to an assembly method used to attach parts to form final products by pushing the parts' interlocking components together. Moreover, snap-fits may refer to integral attachment features or connectors including such advantages as having shorter assembly/labor times and no loose parts. Snap-fit arrangements provide a cost-effective and reliable solution to assemble parts.

The various snap-fit methods and connections as described herein may be solder-free or include solder. That is, some of the snap-fit methods and connections described herein may be referred to as "semi" snap-fit in that the connector facilitates only one a mechanical or an electrical connection, whereas other snap-fit methods and connections facilitate both a mechanical and an electrical connection. For example, and as described below, a portion of a semi snap-fit connection may facilitate a mechanical connection to one component while solder may be used to facilitate an electrical connection to the one component or to a second component.

In some aspects, the snap-fit methods and connections described herein may obviate soldering. Soldering is but one joining process used in the assembly of many electronic components. Soldering may have challenges, such as failures that originate during the packaging process, mostly due to the failure of solder joints. Soldering may require a flux to chemically reduce surface oxides and promote wetting and adhesion of the solder. After soldering, the flux is required to be removed. Moreover, soldering joints, one-at-a-time, can be slow and expensive. Soldered joints may limit the overall device's operating temperature to 50-70% of the solder's melting point. Typically, this translates to a limit of about 150° C. for the device. Reducing and/or eliminating the use of solder may impart significant advantages to the manufacture of electronic components.

Disclosed herein is a brushless DC (BLDC) motor stator and associated method of assembling a stator assembly. A snap-in connection, in the form of an electrical connector or interconnector, is pushed into a printed circuit board assembly (PCBA) and held by a snap-fit mechanism. With this assembly method, the magnet wires of the stator windings are electrically connected with a PCBA via snap-in electrical connectors to complete the stator circuit. In this way, the snap-in connectors advantageously eliminate the need to solder multiple connectors of the stator winding terminals. In this way, the manufacturing and assembly process is simplified and results in a reduction in labor, time, parts, and overall assembly cost. In addition, quality issues associated with soldering are eliminated. Furthermore, using the snap-fit method, the operation reliability of electrical connection is greatly enhanced, especially under high vibration and shock load conditions.

Figure 1B:
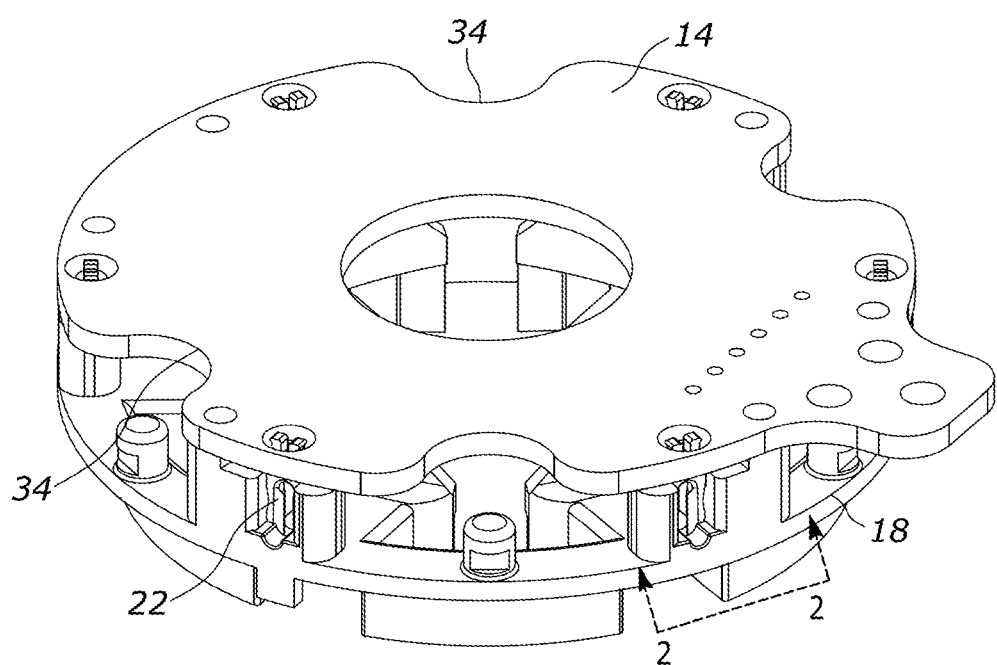
FIG. 1B is a perspective view illustrating electrical connectors interconnecting magnet wires of stator windings and a printed circuit board system (PCBA) for the electrical machine of FIG. 1A.

FIG. 1A illustrates an exemplary electrical machine 10 (e.g., a motor) including a stator lamination core or a stator 2, a rotor 4, a rotor shaft 5, a plurality of motor stator windings 6, and a fan 8. The stator 2 generally defines a cylinder extending along a longitudinal axis. FIG. 1B illustrates a portion of the exemplary electrical machine 10 including a printed circuit board assembly (PCBA) 14, a stator insulator 18 (e.g., a stator insulating structure or bobbin), and electrical interconnectors or connectors 22. The electrical machine 10 may be used in applications such as, but not limited to, providing power to power tools. With reference to FIGS. 1A and 1B, the stator insulator 18 is attached to an end (e.g., a first end) of the stator 2. In the illustrated embodiment, the stator insulator 18 may include a first stator insulator 18 and the electrical machine 10 may additionally include a second stator insulator 24. The second stator insulator 24 may be attached to another end (e.g., a second end) of the stator 2 that is opposite the first stator insulator 18. The fan 8 may be disposed on the rotor shaft 5 such that the second stator insulator 24 is positioned between the fan 8 and the stator 2. Each electrical connector 22 may be coupled to and positioned between the PCBA 14 and the stator insulator 18 to mechanically connect the PCBA 14 and the stator insulator 18. Each connector 22 may electrically connect the PCBA 14 to the stator 2, as will be described below.

Figure 2:
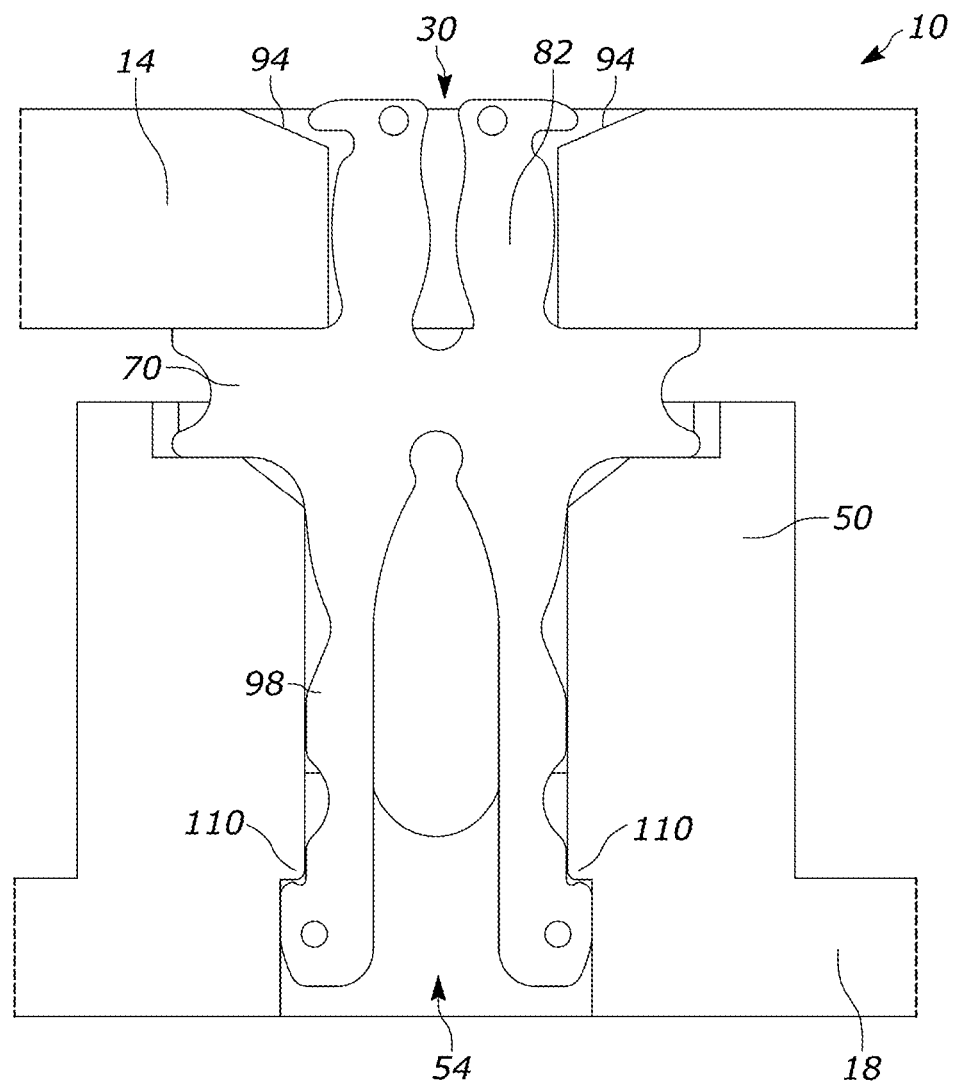
FIG. 2 is a section view of FIG. 1B taken along line 2-2 and illustrating the interconnection between the PCBA and the stator insulator.
Figure 3:
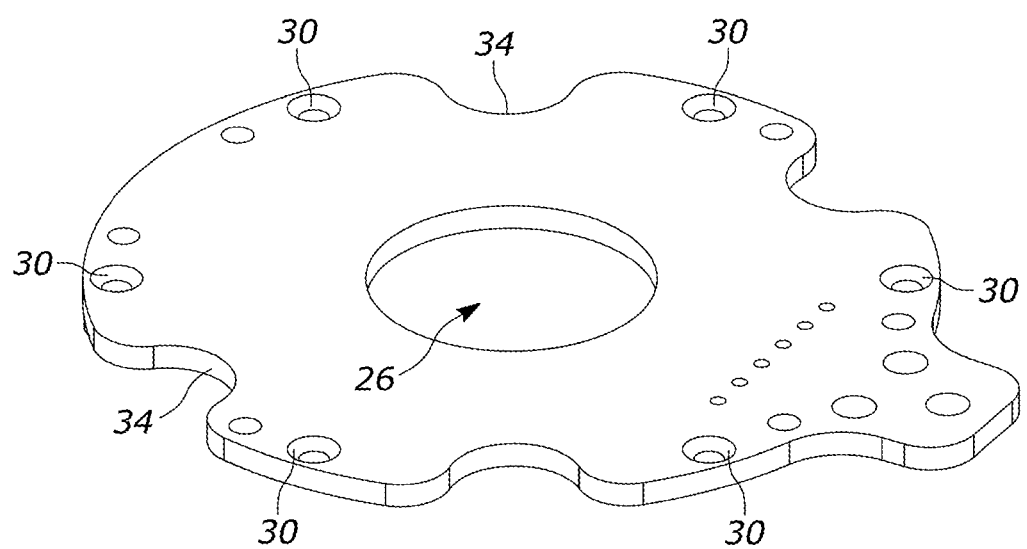
FIG. 3 is a perspective view of the PCBA of FIG. 1B.

With reference to FIGS. 2 and 3, the PCBA 14 may include a central bore 26, a plurality of apertures 30 (e.g., arranged adjacent an outer periphery of the PCBA 14), and a plurality of recesses 34. Components of the electrical machine 10 (e.g., the rotor shaft 5 of FIG. 1) may extend through the central bore 26 to provide a rotational output for the electrical machine 10 of FIG. 1. The electrical connectors 22 extend into or, in some examples. through the apertures 30 and attach to the PCBA 14. The PCBA 14 of the illustrated embodiment includes six apertures 30, although the quantity of apertures 30 may vary depending on the electrical machine 10.

Figure 4:
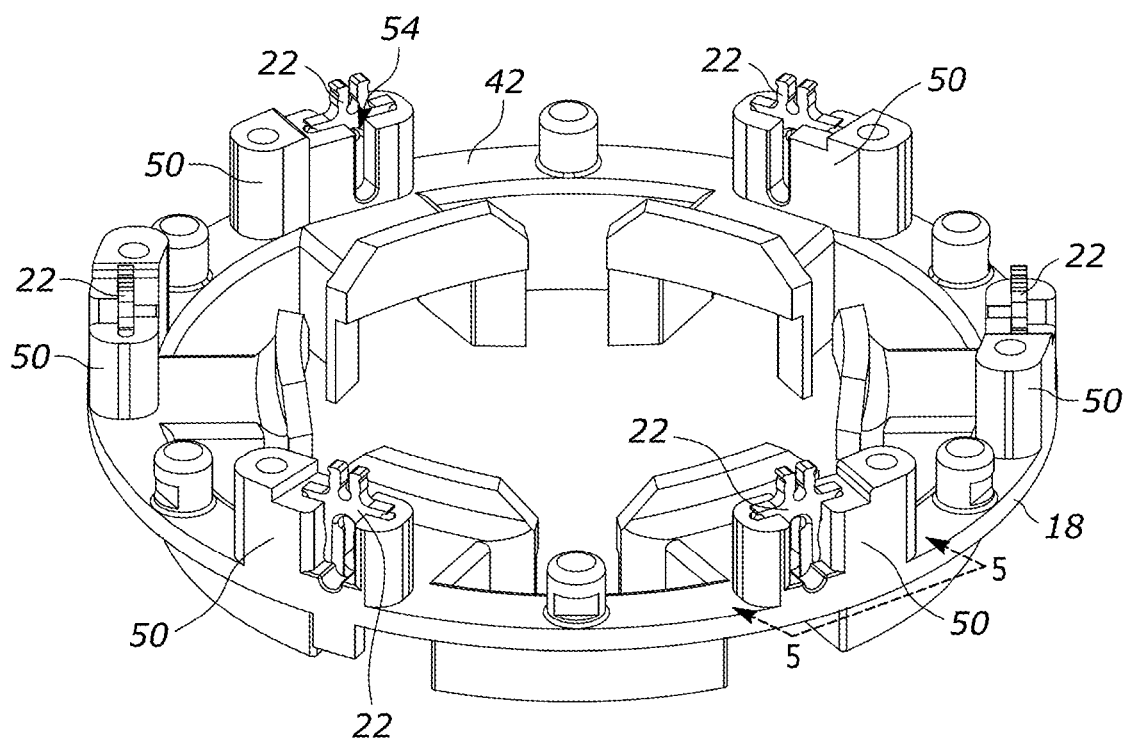
FIG. 4 is a perspective view of the stator insulator and the electrical connectors of FIG. 1B.
Figure 5:
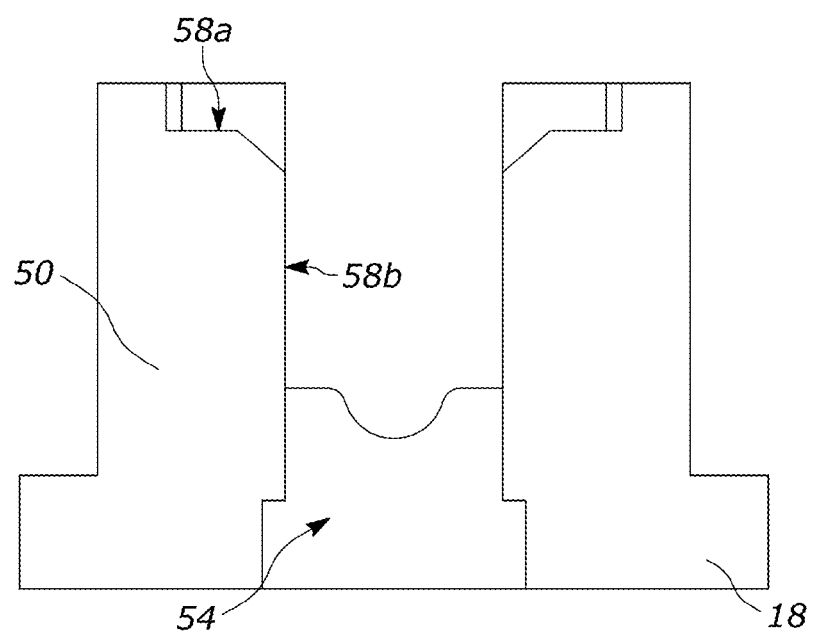
FIG. 5 is a section view of FIG. 4 taken along line 5-5 and illustrating a slot in the stator insulator.

FIG. 4 illustrates the stator insulator 18 that is formed of insulative materials (e.g., polypropylene, or other insulative material(s)) to provide insulation for the motor stator windings 6. The stator insulator 18 includes a ring structure 42 and a plurality of connector receivers 50 that are arranged concentrically around the ring structure 42. The connector receivers 50 may also be referred to as insulator teeth. The connector receivers 50 may extend upward, or away, from the ring structure 42 and directly face a corresponding one of the apertures 30 of the PCBA 14. As best illustrated in FIG. 5, the connector receiver 50 includes a slot 54 that receives a corresponding electrical connector 22. The slot 54 may be "T-shaped" such that a portion 58a of the slot 54 at a top of the connector receiver 50 (as viewed in FIG. 5) is wider than a portion 58b of the slot 54 below the top. Stated another way, the slot 54 includes a laterally extending portion 58a and a vertically extending portion 58b disposed below the laterally extending portion 58a. Referring to FIGS. 2 and 4, the slot 54 receives portions of the electrical connector 22, as described in more detail below.

Figure 6:
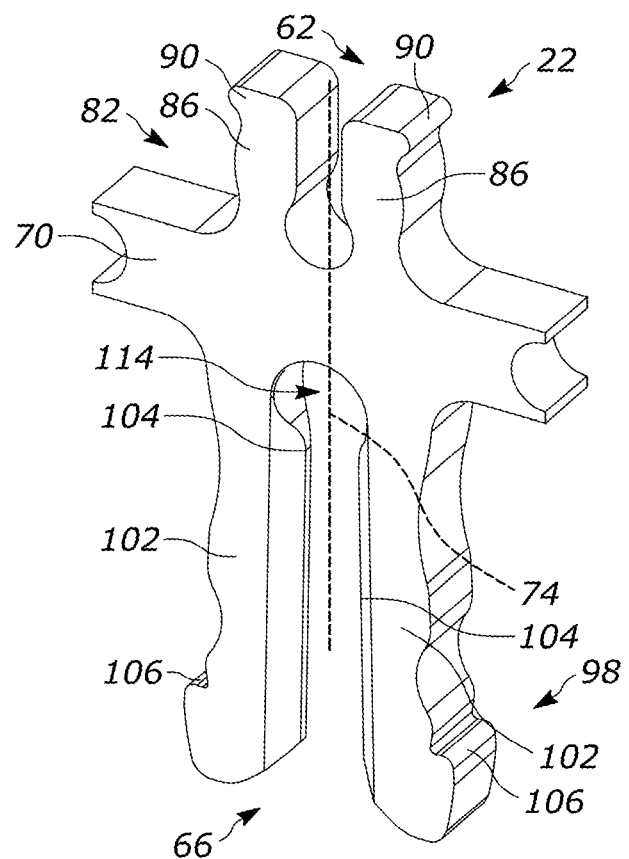
FIG. 6 is a perspective view of the electrical connector of FIG. 1A.

FIG. 6 illustrates that the electrical connector 22 includes a first end 62, a second end 66, a median portion 70, and an axis 74. The electrical connector 22 may be formed of an electrically conductive material such as, but not limited to, copper and copper alloys. The first end 62 may be connectable with the PCBA 14, and the second end 66 may be connectable with the stator insulator 18. The median portion 70 is disposed and positioned between the first end 62 and the second end 66 to separate or buffer the PCBA 14 and the stator insulator 18 so that the PCBA 14 and the stator insulator 18 may not physically touch each other. That is, a gap may be disposed between the PCBA 14 and stator insulator 18, and the gap may be formed, at least in part, by a portion of the electrical connector 22. The axis 74 may include a longitudinally disposed axis that extends between the first end 62 and the second end 66. When the electrical machine 10 is assembled, the electrical connectors 22 may extend parallel, or substantially parallel, to the axis along which the stator 2 extends.

In the illustrated embodiment, the electrical connector 22 includes one or more first portions or pins 82 positioned at and at least partially defining the first end 62. The pin 82 and the electrical connector 22 may be integrally formed from the same material, and the pin 82 may include one or more outwardly biased pin legs 86 having pin engaging ends 90 positioned opposite the median portion 70 of the electrical connector 22. As illustrated, the pin 82 has two pin legs 86 and each of the pin legs 86 may be positioned on a corresponding side of the axis 74. The pin legs 86 may be molded or formed in a shape that is complementary to the apertures 30 of the PCBA 14 to allow the pin 82 to snap-fit to a corresponding one of the plurality of apertures 30 of the PCBA 14. The pin legs 86 may be biased (e.g., squeezed) toward the axis 74 as the pin 82 is inserted into the corresponding one of the plurality of apertures 30 to facilitate connection. After the pin 82 has been fully inserted, the inward bias of the pin legs 86 due to squeezing, may be released, which causes the pin legs 86 to extend away from the axis 74. As the pin legs 86 move away from the axis 74, the pin engaging ends 90 are received by PCBA ledges 94, to secure the pin 82 within the corresponding one of the plurality of apertures 30. Thus, the pin 82 may be mechanically and electrically coupled to the PCBA 14 of FIG. 3 in a snap-fit arrangement.

With continued reference to FIG. 6, the electrical connector 22 may additionally include a second portion or an insulation displacement contact (e.g., "IDC") 98 disposed adjacent to the median portion 70, opposite the pin 82 region disposed at the first end 62. The IDC 98 includes outwardly biased IDC legs 102 extending from the median portion 70 opposite the pin 82 to IDC engaging ends 106. Each of the IDC legs 102 may be positioned on a corresponding side of the axis 74. With reference to FIG. 5, the IDC legs 102 may be molded or formed in a shape that is complementary to the slot 54 of the connector receiver 50 to allow the IDC 98 to effectively snap-in to the connector receiver 50. The IDC legs 102 may be biased (inward) toward the axis 74 by way of squeezing, as the IDC 98 is inserted into the connector receiver 50. After the IDC 98 has been fully inserted, as seen in FIG. 4, the inward bias of the IDC legs 102 may be released, thereby causing the IDC legs 102 to reactively bias away from the axis 74. Referring to FIGS. 2 and 6, as the IDC legs 102 bias away from the axis 74, the IDC engaging ends 106 are received by stator insulator ledges 110 to secure the IDC 98 within the slot 54 of the connector receiver 50 of FIG. 5. Thus, the IDC 98 may be mechanically coupled to the stator insulator 18 of FIG. 4 in a snap-fit arrangement.

In some embodiments, the pin 82 may be coupled to the PCBA 14 of FIG. 3, and the IDC 98 may be coupled to the connector receiver 50 in a snap-fit arrangement without user bias. For example, prior to full insertion into the apertures 30 of the PCBA 14, the pin 82 may be inserted into the apertures 30 of the PCBA 14 such that the PCBA 14 inherently flexes or biases the pin legs 86 toward the axis 74. That is, prior to full insertion into one the apertures 30, the pin legs 86 may automatically flex or bias toward the axis 74. On full insertion into one of the apertures 30, the pin legs 86 may then flex or bias away from the axis 74 such that the pin legs 86 are secured in snap-fit engagement with the PCBA 14. Additionally, prior to full insertion into the slot 54 of the connector receiver 50, the IDC 98 may be inserted into the slot 54 of the connector receiver 50 such that the connector receiver 50 flexes or biases the IDC legs 102 toward the axis 74. That is, prior to full insertion into one the slots 54, the IDC legs 102 may automatically flex or bias toward the axis 74. On full insertion into one of the slots 54, the IDC legs 102 may then flex or bias away from the axis 74 such that the IDC legs 102 are secured in snap-fit engagement with the connector receiver 50.

Additionally, the IDC 98 is designed to terminate magnet wires of the motor stator windings 6 without the need for stripping the insulation films of magnet wires. The magnet wire may be positioned between the legs 102. The gap and finish of the legs 102 are designed according to the size of magnet wires. Each of the IDC legs 102 may include edges 104 facing toward the axis 74, such edges 104 are sharp enough to pierce standard insulation or film surrounding the magnet wire after the IDC legs 102 engage the wire, which creates a direct electrical connection between the IDC 98 and the wire. As such, the connectors 22 facilitate an electrical connection between the PCBA 14 and the stator 2 without soldering in addition to the mechanical connection described above. To create a direct electrical connection between the IDC 98 and magnet wires, the inner edges 104 of the legs 102 should be sharp enough to pierce the insulation layer on the magnet wires. This fast and effective connection technology can greatly reduce the assembly time, ease of assembly, and enhance the operating reliability of the electrical connectors 22.

With reference again to FIG. 2, the respective snap-fit arrangements between the pin 82 and the PCBA 14, and between the IDC 98 and the stator insulator 18, eliminate and/or reduce separation risks. For example, the snap-fit arrangements may ensure that the electrical connection between the pin 82 inserted in the apertures 30 of the PCBA 14 and the IDC 98 inserted in the slot 54 of the stator insulator 18, even under strong vibration and shock operating conditions of the electrical machine 10. Stated another way, the snap-fit arrangements may reduce, and in some cases, completely eliminate separation risks and greatly enhance the operation reliability of the electrical connector 22 over existing connectors that primarily rely on friction for retention. By improving the connection strength of the electrical connector 22 with the PCBA 14 and the stator insulator 18, the ability of the electrical connector 22 to retain magnet wires (not shown) that may be used to create an electro-magnetic field within the electrical machine 10 is improved. The snap-fit arrangements further minimize the connection length between the PCBA 14 and the stator insulator 18, thereby reducing an overall length of the electrical machine 10. The reduced overall length of the electrical machine 10 improves manufacturing ease and reduce overall cost of the electrical machine 10.

As illustrated in FIG. 6, the IDC 98 further includes a stress release region or portion, such as a stress release aperture or hole 114, positioned adjacent to the median portion 70. The stress release hole 114 is configured to reduce stress throughout the electrical connector 22 as the IDC 98 is inserted into the connector receiver 50 of FIG. 5 by alleviating bending stresses. The stress release hole 114 may further reduce stress throughout the electrical connector 22 as the pin 82 is snap-fit to the PCBA 14. The stress release hole 114 may even further reduce stress throughout the electrical connector 22 as the electrical connector 22 may be subjected to vibration and shock from operation of the electrical machine 10 of FIG. 1. Reducing stress may advantageously increase the longevity of the electrical connector 22, thereby reducing how frequently the electrical connector 22 needs to be replaced, if ever. Additionally, the stress release hole 114 may improve the ease with which the electrical connector 22 can be removed and/or disassembled from the electrical machine 10 of FIG. 1.

Figure 7:
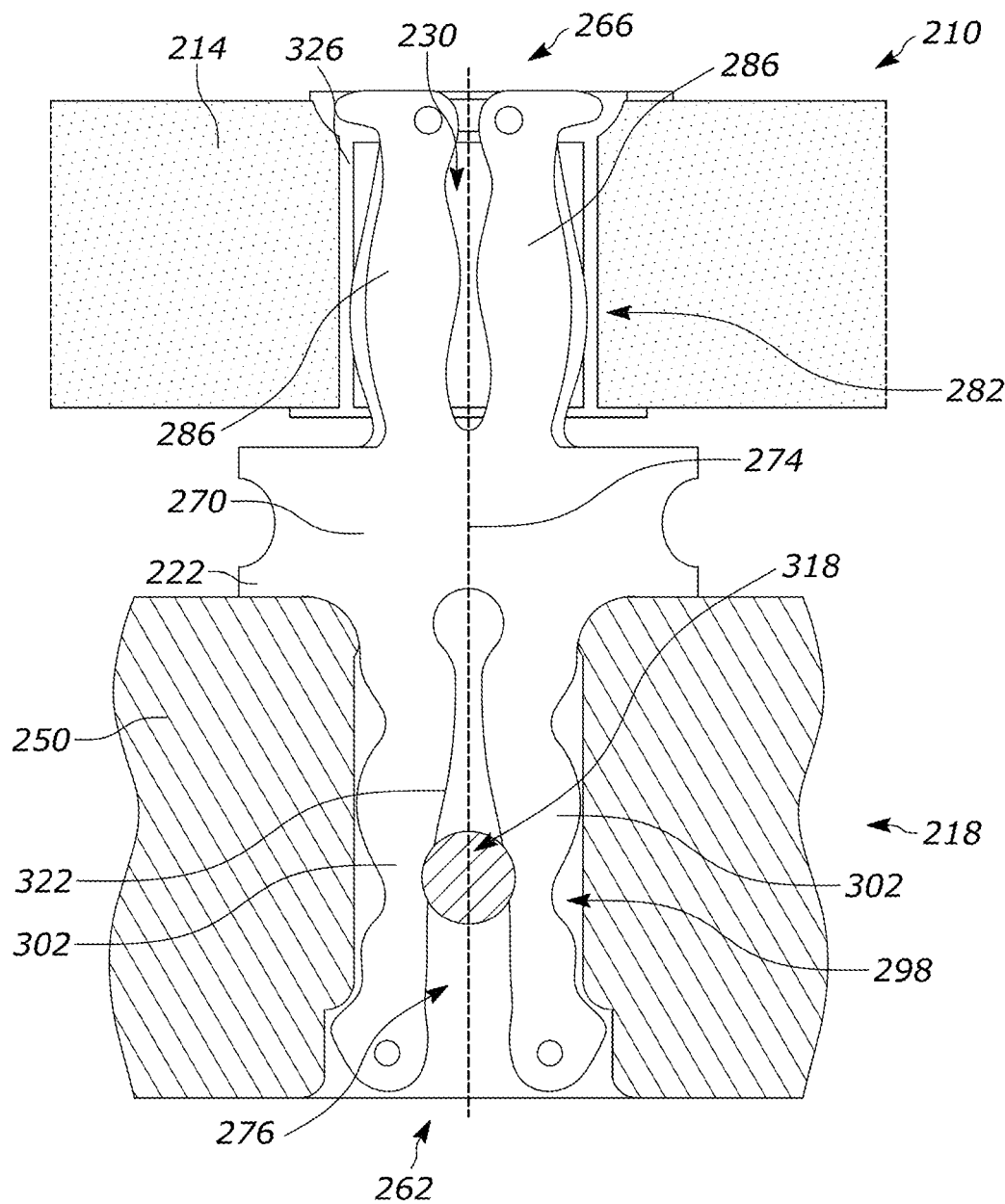
FIG. 7 is schematic section view of another exemplary electrical connector electrically coupling the magnet wires of stator windings to the PCBA.

FIG. 7 illustrates another exemplary embodiment of an electrical connector 222. The illustrated electrical connector 222 is similar to the electrical connector 22 described above with reference to FIGS. 1-6. As such, like parts have been given like reference numbers, plus 200. Description of the electrical connector 22 above applies equally to the electrical connector 222. The electrical connector 222 includes a first portion, in the form of a pin 282 that has pin legs 286 and a second portion in the form of an IDC 298 with IDC legs 302. Similarly to the connector 22 of FIG. 1, the connector 222 may mechanically couple a PCBA 214 and a stator insulator 218 in a snap-fit arrangement. The first and second portions may be integrally formed with and extend from a median portion 270. After the illustrated IDC 298 is snap-fit to the stator insulator 218, the IDC legs 302 become rigidly secured to the connector receiver 250 such that the IDC legs 302 are inhibited from moving in the absence of some form of manipulation (e.g., user manipulation). More specifically, inward forces (e.g., forces applied toward the axis 274) from the IDC legs 302 push against magnet wires 318 to secure the wires 318 to the IDC 298. Each of the IDC legs 302 may include a singular continuous curved portion 322. The curved portion 322 may include a curvature variably changeable with a position on the IDC legs 302. That is, the width of a gap 276 between the IDC legs 302 varies along an axis 274 as the curved portion 322 extends from the second end 266 toward the first end 262 of the electrical connector 222. A variably changing curvature of the curved portion 322 allows the electrical connector 222 to receive wires 318 of different sizes. That is, the electrical connector 222 is compatible for receiving wires 318 between 23 American Wire Gauge (AWG) (e.g., 0.5 mm) and 17 AWG (e.g., 1.2 mm), or even lower AWG (>1.2 mm). The variably changing curvature on each of the IDC legs 302 advantageously enables compatibility with multiple wire sizes, thereby allowing a user to adjust performance of an electrical machine 210. As such, the connector 222 may facilitate an electrical connection between the PCBA 214 and the wires 318, thereby electrically connecting the PCBA 214 with a stator, such as the stator 2, without soldering.

As further illustrated in FIG. 7, the PCBA 214 may optionally include a copper lining 326. In such embodiments, the copper lining 326 lines each of the plurality of apertures 230 and receives a corresponding electrical connector 222. The copper lining 326 may aid in providing an electrical connection between the electrical connector 222 and the PCBA 214. The copper lining 326 may additionally improve the strength and stability of snap-fit arrangements between the electrical connector 222 and the PCBA 214.

Figure 8:
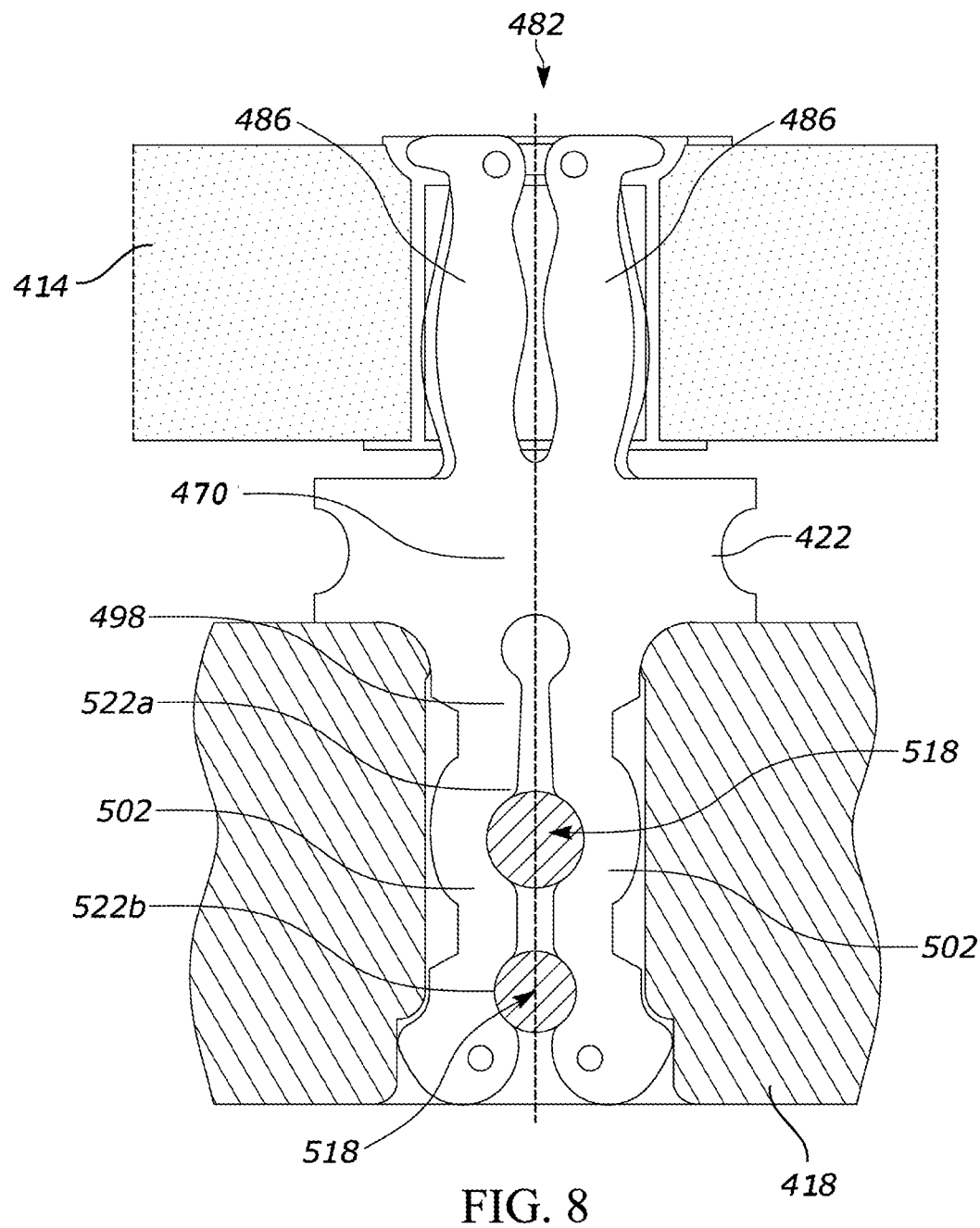
FIG. 8 is a schematic section view of another exemplary electrical connector electrically coupling magnet wires of stator windings to the PCBA.

FIG. 8 illustrates another exemplary embodiment of an electrical connector 422. The illustrated electrical connector 422 is similar to the electrical connector 22 described above with reference to FIGS. 1-6. As such, like parts have been given like reference numbers, plus 400. The electrical connector 422 is also similar to the electrical connector 222 described above with reference to FIG. 7. As such, like parts have been given like reference numbers, plus 200. Description of the electrical connectors 22, 222 above applies equally to the electrical connector 422. Only the differences among the electrical connectors 22, 222, 422 are explained below. The electrical connector includes a median portion 470, a pin 482 that has pin legs 486, and an IDC 498 that has IDC legs 502. The connector 422 may mechanically couple a PCBA 414 and a stator insulator 418 in a snap-fit arrangement. The IDC legs 502 have a plurality of curved portions 522a, 522b. Each of the curved portions 522a, 522b may include different curvatures respective to the other of the curved portions 522a, 522b. Each of the different curvatures is similar to a corresponding wire 518 size such that the IDC 498 may receive multiple wires 518 of different sizes at the same time. Alternatively, the IDC 498 may receive just one wire 518 with a curvature similar to a corresponding one of the curved portions 522a, 522b at a time. In some embodiments, the electrical connector 422 may have fewer or more than two curved portions 522a, 522b such that the electrical connector 422 may receive fewer or more than two wires 518 at once. As such, the connector 422 may facilitate an electrical connection between the PCBA 414 and one or multiple wires 518, thereby electrically connecting the PCBA 414 with a stator, such as the stator 2, without soldering.

Figure 9:
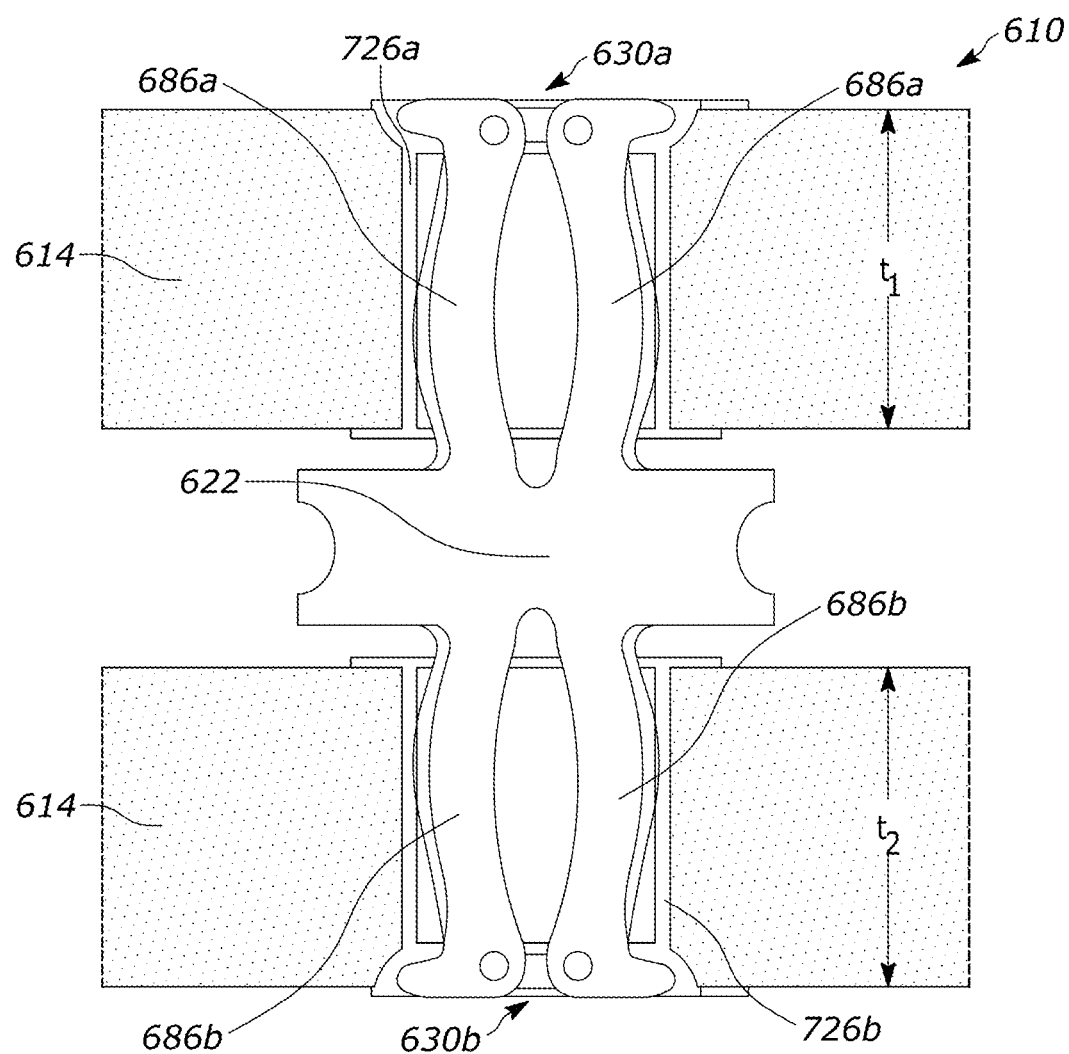
FIG. 9 is a schematic section view of another exemplary electrical connector electrically coupling magnet wires of the stator winding to the PCBA.

FIG. 9 illustrates another exemplary embodiment of an electrical connector 622. The illustrated electrical connector 622 is similar to the electrical connector 22 described above with reference to FIGS. 1-6. As such, like parts have been given like reference numbers, plus 600. The electrical connector 622 is also similar to the electrical connector 222 described above with reference to FIG. 7. As such, like parts have been given like reference numbers, plus 400. Description of the electrical connectors 22, 222 above applies equally to the electrical connector 622. In the illustrated embodiment of FIG. 9, an electrical machine 610 includes a plurality of PCBAs 614. Each of the PCBAs 614 may include apertures 630a, 630b with copper linings 726a, 726b. The electrical connector 622 may be coupled to each of the PCBAs 614 in a snap-fit arrangement, thereby mechanically and/or electrically connecting two or more PCBAs to each other. The snap-fit arrangement connecting the PCBAs advantageously improves signal transfer reliability through contact areas in severe shock/vibration applications.

The illustrated electrical connector 622 may connect the PCBAs 614 in a parallel configuration, as shown in FIG. 9, or in a perpendicular configuration (not shown). In the parallel configuration, pin legs 686a coupled to one of the PCBAs 614 extend planar with pin legs 686b coupled to the other of the PCBAs 614. In the perpendicular configuration, the pin legs 686a coupled to one of the PCBAs 614 extend along a first plane, and the pin legs 686b coupled to the other of the PCBAs 614 extend along a second plane that is perpendicular to the first plane. Additionally, the illustrated electrical connector 622 is compatible with PCBs of different thicknesses to improve assembling flexibility. In the illustrated embodiment, one of the PCBAs 614 has a first thickness $t_1$, and the other of the PCBAs 614 has a thickness $t_2$. Such thicknesses $t_1$ and $t_2$ may be the same value or different values. In some embodiments, the electrical connector 622 includes an optional coating for improving durability and corrosion resistance, further improving durability of the electrical connector 622.

Figure 10:
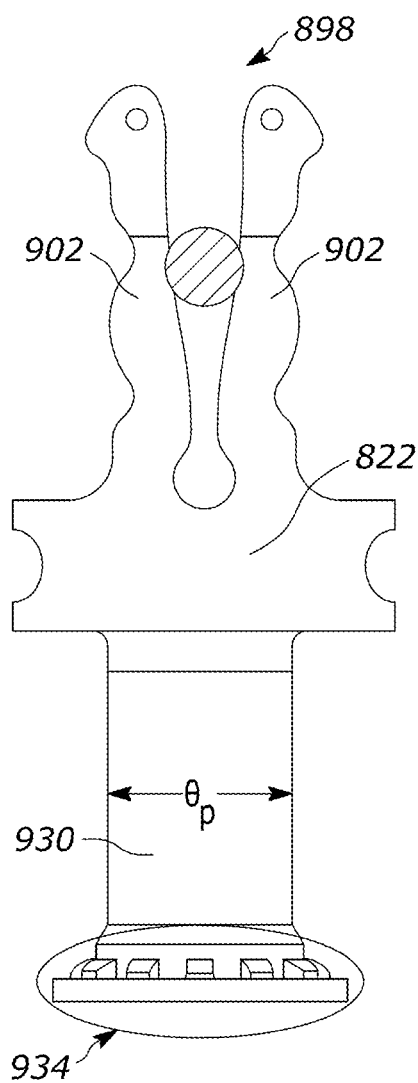
FIG. 10 is a schematic front view of another exemplary electrical connector.
Figure 11:
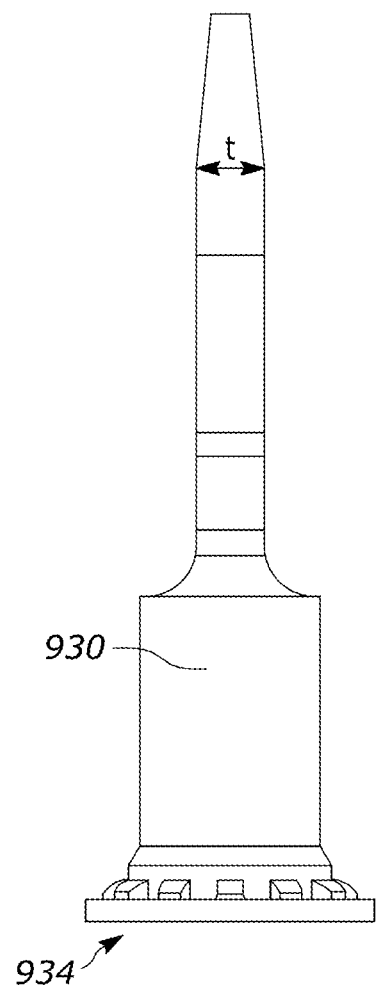
FIG. 11 is a side view of the electrical connector of FIG. 10.
Figure 12:
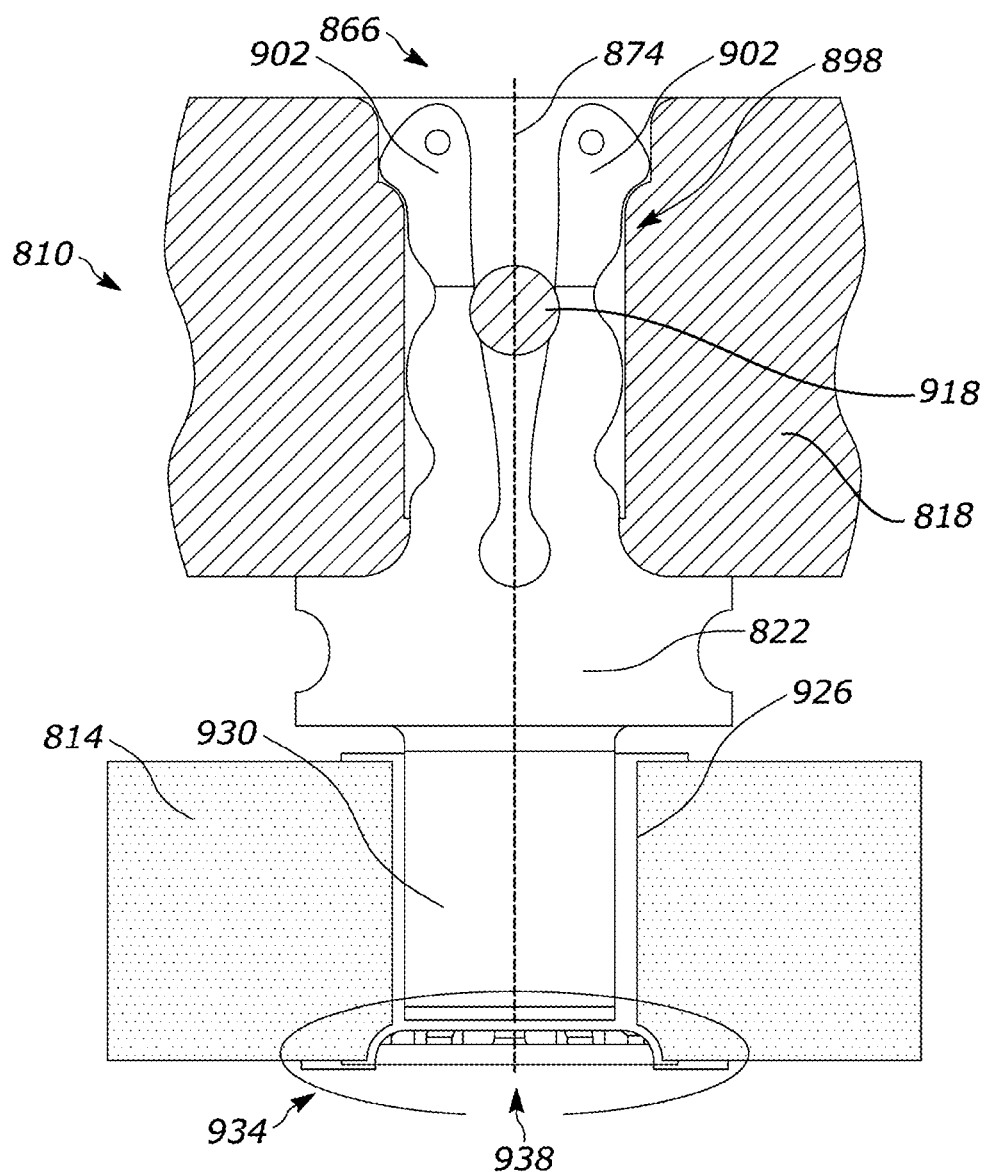
FIG. 12 is a schematic section view of the electrical connector of FIG. 10 electrically connecting magnet wires of stator windings to a PCBA.

FIGS. 10-12 illustrate another exemplary embodiment of an electrical connector 822. The illustrated electrical connector 822 is similar to the electrical connector 22 described above with reference to FIGS. 1-6. As such, like parts have been given like reference numbers, plus 800. The electrical connector 822 is also similar to the electrical connector 222 described above with reference to FIG. 7. As such, like parts have been given like reference numbers, plus 600. Description of the electrical connectors 22, 222 above applies equally to the electrical connector 822. Only the differences among the electrical connectors 22, 222, 822 are explained below. The electrical connector 822 includes an IDC 898 including IDC legs 902. The connector 822 may mechanically couple to a stator insulator 818 in a snap-fit arrangement and may electrically couple to a wire 918 from a stator, such as the stator 2. The electrical connector 822 further includes a self-clinching mechanism 930 with a clinch end 934. The clinch end 934 is configured to couple with a copper wire lining 926 of a PCBA 814. That is, a user may secure the clinch end 934 to the PCBA 814 by supplying a force 938 at the clinch end 934 along an axis 874 in the direction of a second end 866 of the electrical connector 822 to create or form a clinch connection between the connector 822 and the PCBA 814. The self-clinching mechanism 930 may facilitate a mechanical and/or electrical connection to the PCBA 814 rather than or in place of a pin, such as the pin 82 of FIG. 6. Therefore, the electrical connector 822 may facilitate a mechanical connection between the PCBA 814 and the stator insulator 818 and may facilitate an electrical connection between the PCBA 814 and the wire 918.

The self-clinching mechanism 930 simplifies the assembling process by reducing the steps needed for full assembly of an electrical machine 810. The self-clinching mechanism 930 further reduces maintenance for the electrical connector 822. Without selective pin (not shown in FIGS. 10-12) biasing, bending stresses from said pin are eliminated. Additionally, the self-clinching mechanism 930 provides a permanent joint between the electrical connector 822 and the PCBA 814 to further increase connection reliability. The self-clinching mechanism 930 thereby makes the electrical connector 822 more cost efficient and performance enhanced.

Figure 13:
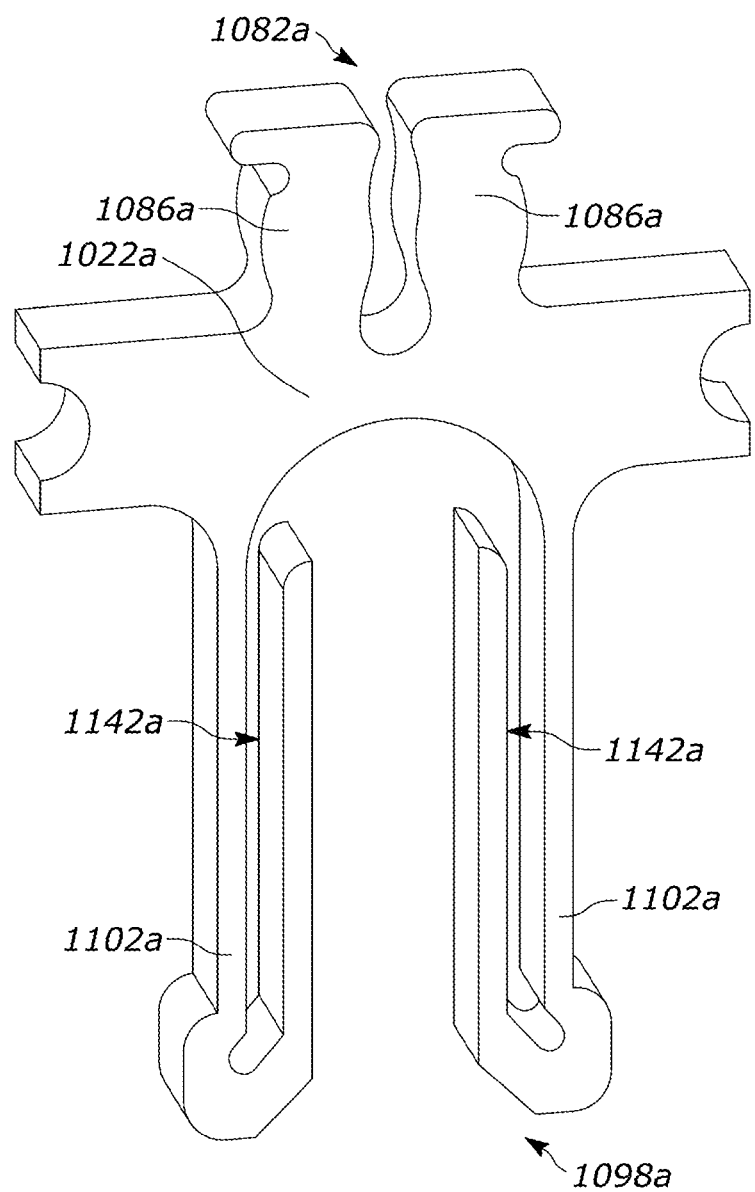
FIG. 13 is a perspective view of another exemplary electrical connector.

FIG. 13 illustrates another exemplary electrical connector 1022a that is similar to the electrical connector 22 described above with regard to FIGS. 1-6. As such, like parts have been given like reference numbers, plus 1000. The electrical connector 1022a is also similar to the electrical connector 222 described above with regard to FIG. 7. As such, like parts have been given like reference numbers, plus 800. Description of the electrical connectors 22, 222 above applies equally to the electrical connector 1022a. Only the differences among the electrical connectors 22, 222, 1022a are explained below. The electrical connector 1022a includes a pin 1082a that has pin legs 1086a and an IDC 1098a that has IDC legs 1102a. The connector 1022a may mechanically couple a PCBA and a stator insulator, such as the PCBA 14 and the stator insulator 18 of FIG. 1, in a snap fit arrangement. The electrical connector 1022a includes a slot 1142a on each IDC leg 1102a for retaining magnet wires (not shown). In the illustrated embodiment, each of the slots 1142a extends parallel and is formed integrally with the IDC legs 1102a. The slot 1142a on one of the IDC legs 1102a may be formed of a different width than the slot 1142a on the other of the IDC legs 1102a. Varying the width of the slot 1142a advantageously enables each slot 1142a to be compatible with wires of the same or different sizes. Additionally, insertion of a single wire into one of the slots 1142a is independent of insertion of another wire into the other of the slots 1142a, thereby enhancing the operation reliability of the electrical connector 1022a. The connector 1022a may facilitate an electrical connection between a PCBA and one or multiple wires (e.g., such as the wire 318 of FIG. 7), thereby electrically connecting a PCBA to a stator, such as the stator 2, without soldering.

Figure 14:
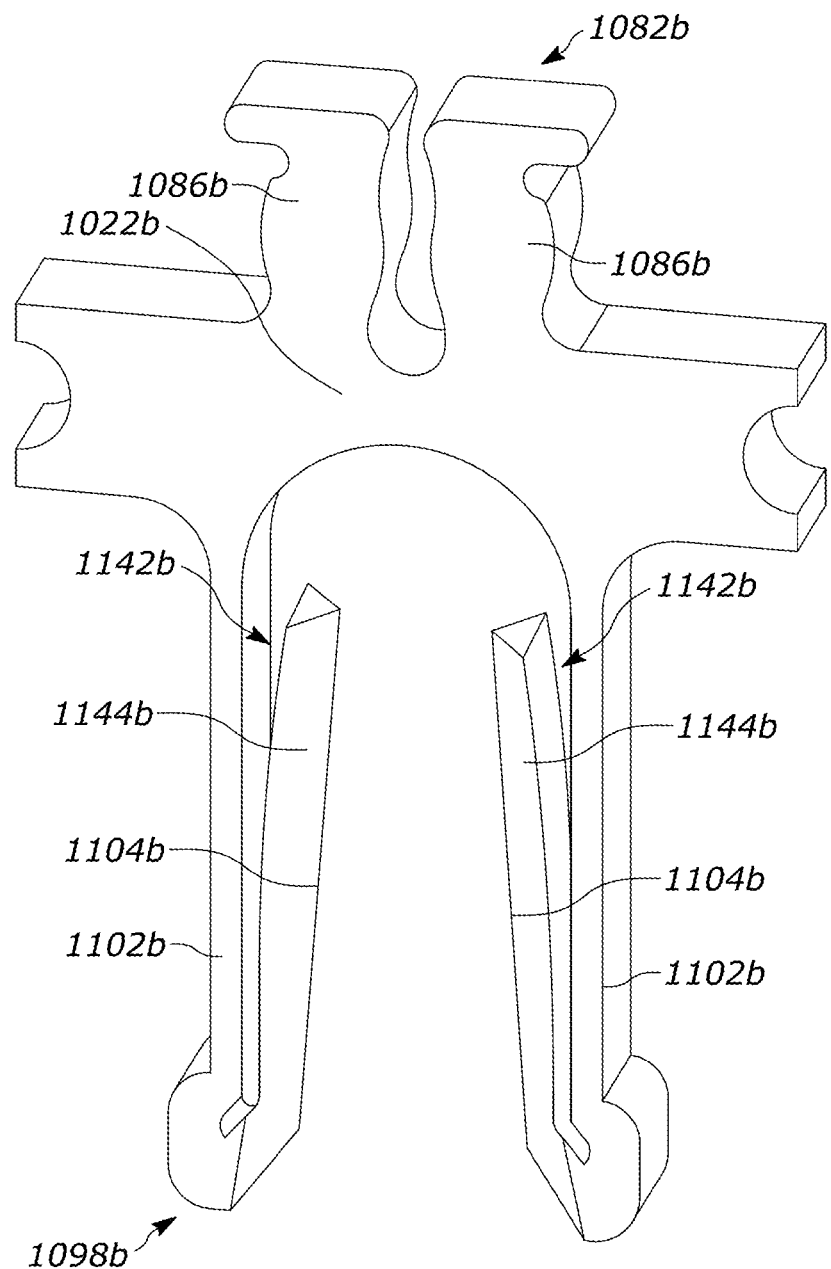
FIG. 14 is a perspective view of another exemplary electrical connector.

FIG. 14 illustrates another exemplary electrical connector 1022b including a pin 1082b that has pin legs 1086b and an IDC 1098b that has IDC legs 1102b. The connector 1022b may mechanically couple a PCBA and a stator insulator, such as the PCBA 14 and the stator insulator 18 of FIG. 1, in a snap-fit arrangement. Each IDC leg 1102*b* has an edge 1104*b* on a corresponding inner IDC leg portion 1144*b* that faces the other of the IDC legs 1102*b*. The edges 1104*b* may be sharpened (e.g., blade-like) to ensure that the inner IDC leg portions 1144*b* can pierce insulation on magnet wires and create a direct electrical connection between the electrical connector 1022*b* and the wire. In the illustrated embodiment, the gap between the inner IDC leg portions 1144*b* is larger than slots 1142*b*, thereby enabling the electrical connector 1022*b* to retain wires that are relatively larger than the width of the slots 1142*b*. As such, a single wire may be individually retained in each slot 1142*b* and in between the inner IDC leg portions 1144*b*, or in any combination thereof. Therefore, the edges 1104*b* improve the flexibility of the electrical connector 1022*b* to retain wires in a wide range of sizes. The connector 1022*b* may facilitate an electrical connection between a PCBA and one or multiple wires (e.g., such as the wire 318 of FIG. 7), thereby electrically connecting a PCBA to a stator, such as the stator 2, without soldering.

Figure 15:
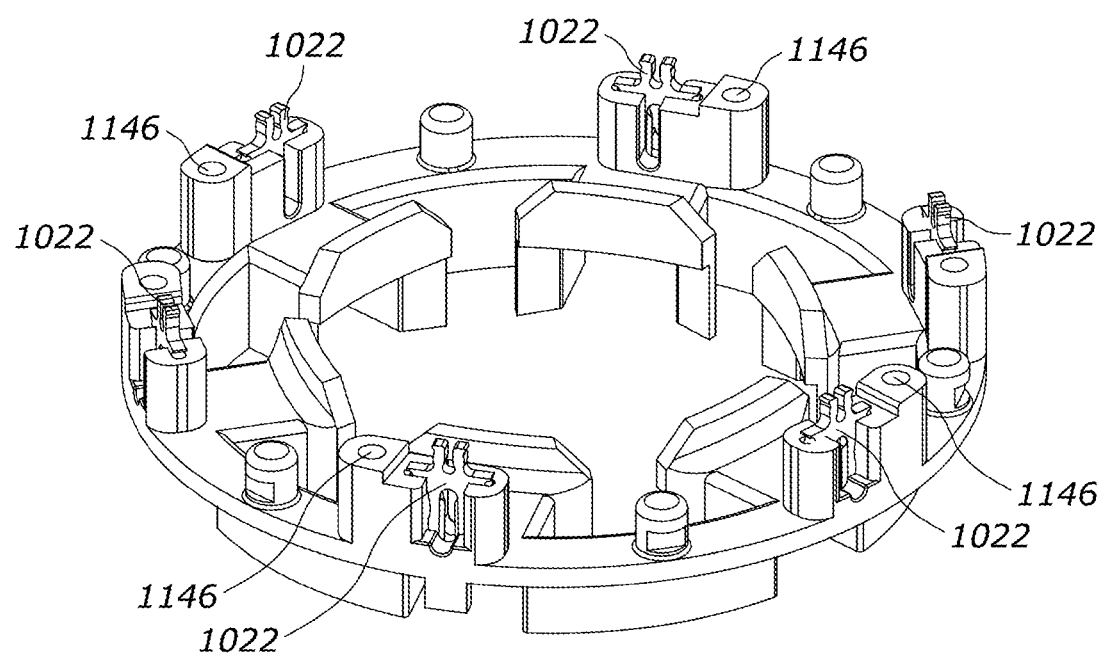
FIG. 15 is a perspective view of another exemplary stator insulator and the electrical connectors of FIG. 13.
Figure 16:
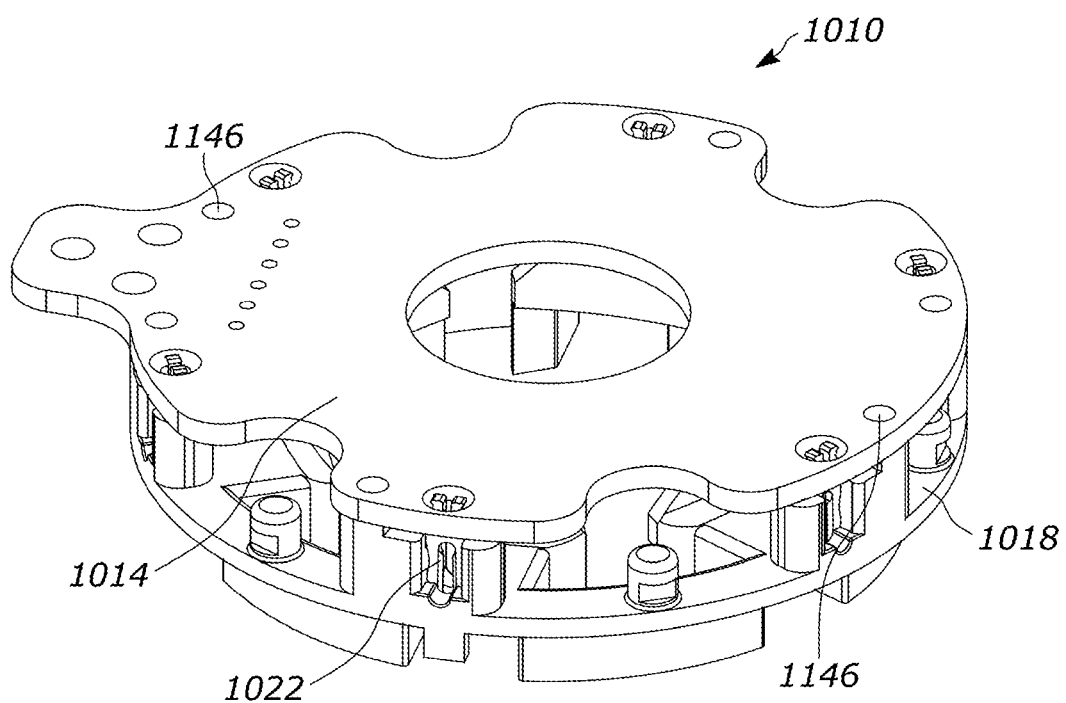
FIG. 16 is a perspective view illustrating the electrical connectors of FIG. 13 interconnecting another exemplary PCBA and the stator insulator of FIG. 15.

FIGS. 15 and 16 illustrate an electrical machine 1010 according to another embodiment of the disclosure. The electrical machine 1010 includes coupling components 1146 in addition to the electrical connectors 1022. The coupling components 1146 may be one of a protrusion and an aperture positioned on a PCBA 1014 that mates with a corresponding other of the protrusion and the aperture on a stator insulator 1018. The coupling components 1146 provide another connecting means between the PCBA 1014 and the stator insulator 1018 in addition to the electrical connector 1022, thereby improving connection and operation reliability of the electrical machine 1010.

Figure 17B:
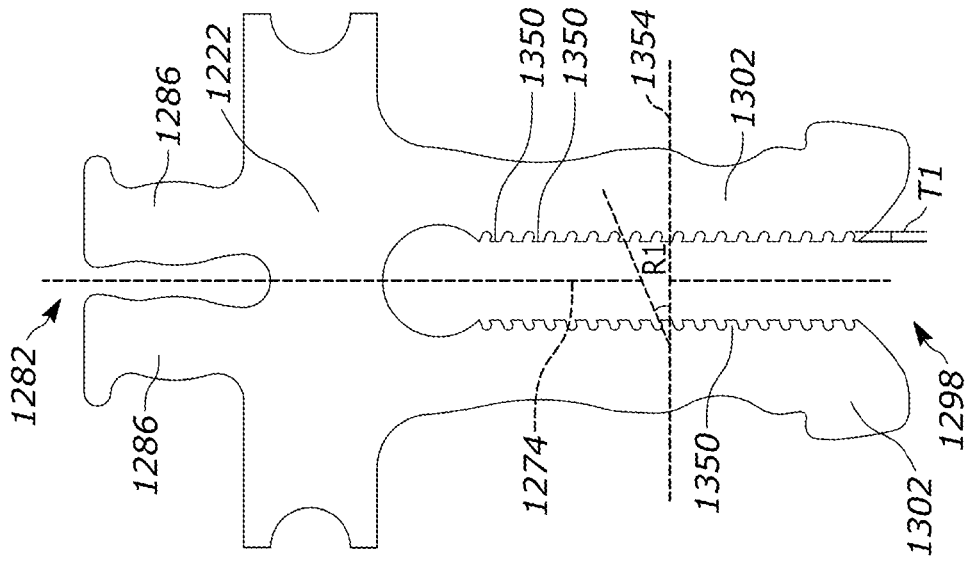
FIG. 17B is a front view of the electrical connector of FIG. 17A.
Figure 17A:
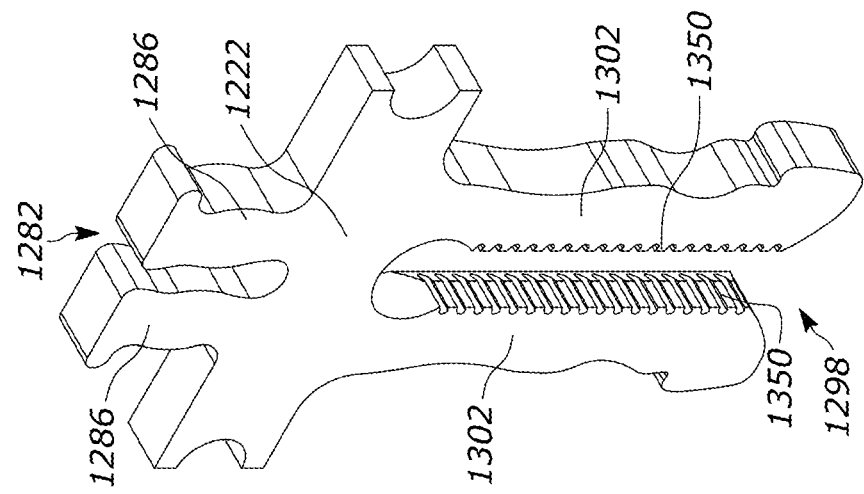
FIG. 17A is a perspective view of another exemplary electrical connector.

FIGS. 17A and 17B illustrate another exemplary embodiment of an electrical connector 1222 that is similar to the electrical connector 22 described above with reference to FIGS. 1-6. As such, like parts have been given like reference numbers, plus 1200. The electrical connector 1222 also is similar to the electrical connector 222 described above with reference to FIG. 7. As such, like parts have been given like reference numbers, plus 1000. Description of the electrical connectors 22, 222 above applies equally to the electrical connector 1222. Only the differences among the electrical connectors 22, 222, 1222 are explained below.

The electrical connector 1222 defines a central axis 1274 and includes a pin 1282 that has two pin legs 1286 and an IDC 1298 that has two IDC legs 1302. The connector 1222 may mechanically couple a PCBA and a stator insulator, such as the PCBA 14 and the stator insulator 18 of FIG. 1, in a snap-fit arrangement. The IDC legs 1302 include a plurality of teeth 1350 on an inner side of each of the IDC legs 1302 (e.g., facing the axis 1274) that define a saw-like structure for the electrical connector 1222. Each of the teeth 1350 has a leading angle R1 and a tooth depth T1. As shown, the leading angle R1 is oriented upward relative to a reference axis 1354 (extending horizontally when viewed in FIG. 17B) that extends perpendicular to the central axis 1274. In the illustrated embodiment, the leading angle R1 may be between 10 and 45 degrees relative to the reference axis 1354. The tooth depth T1 is defined as the distance along the reference axis 1354 that the teeth 1350 extend from the IDC legs 1302. In the illustrated embodiment, the tooth depth T1 may be between 0.02 and 0.10 mm. The tooth depth T1 may be dependent on the wire thickness (e.g., diameter) and/or the thickness of an insulation layer of a magnet wire inserted between the IDC legs 1302. The plurality of teeth 1350 may advantageously pierce standard insulation or film surrounding magnet wires and retain magnet wires firmly between two IDC legs 1302. As such, the connector 1222 may facilitate an electrical connection between a PCBA and one or multiple wires (e.g., such as the wire 318 of FIG. 7), thereby electrically connecting a PCBA to a stator, such as the stator 2, without soldering.

Figure 18A:
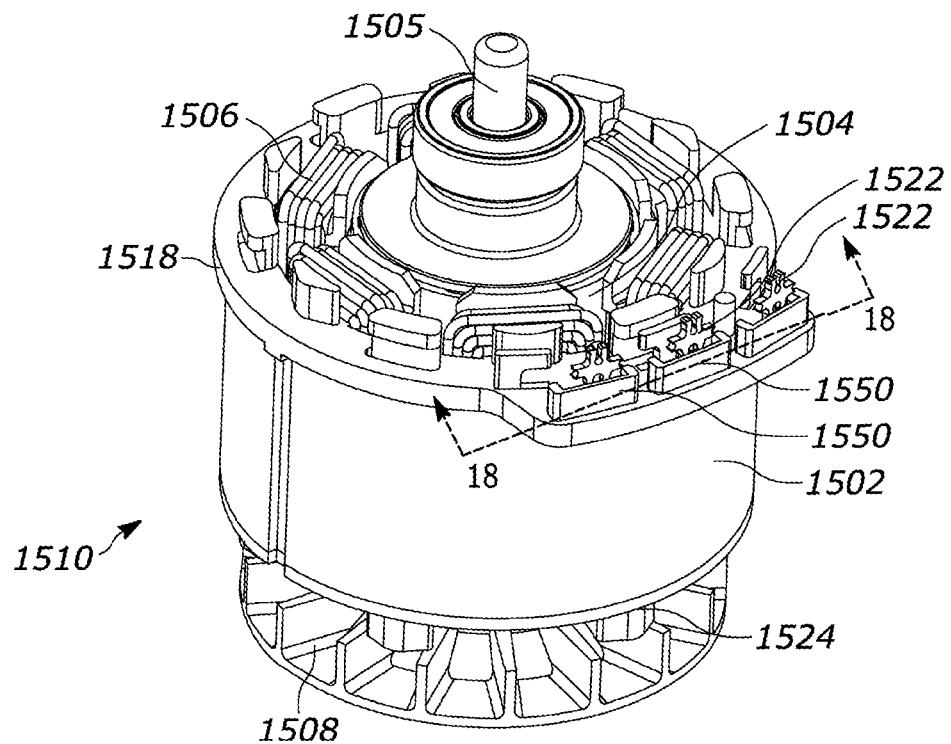
FIG. 18A is a perspective view of another exemplary electrical machine including a stator insulator.
Figure 18B:
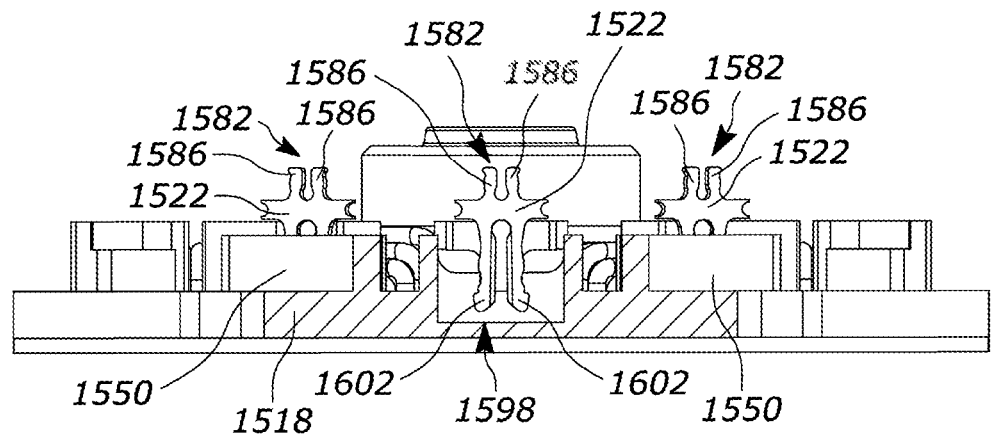
FIG. 18B is a cross-sectional view of the electrical machine of FIG. 18A taken along line 18-18.

FIGS. 18A and 18B illustrate an electrical machine 1510 (e.g., a motor) according to another embodiment of the disclosure. The electrical machine 1510 is substantially similar to the electrical machine 10 of FIG. 1 except for the differences described herein. The electrical machine 1510 includes a stator 1502, a rotor 1504, a rotor shaft 1505, a plurality of motor stator windings 1506, and a fan 1508. The stator 1502, the rotor 1504, the rotor shaft 1505, the plurality of motor stator windings 1506, and the fan 1508 may be substantially similar, and in some instances, identical, to the stator 2, the rotor 4, the rotor shaft 5, the plurality of motor stator windings 6, and the fan 8 of the electrical machine 10 of FIG. 1. The electrical machine 1510 further includes a first stator insulator 1518, electrical connectors 1522, and a second stator insulator 1524. The first stator insulator 1518 is positioned on an end of the stator 1502, and the second stator insulator 1524 is positioned on another end of the stator 1502 that is opposite the end on which the first stator insulator 1518 is located. The fan 1508 is disposed on the rotor shaft 1505 at a location such that the second stator insulator 1524 is positioned between the stator 1502 and the fan 1508. The electrical connectors 1522 may be substantially similar to any of the electrical connectors 222, 422, 622, 822, 1022, 1222 disclosed above such that the electrical connector 1522 includes a pin 1582 that has pin legs 1586 and an IDC 1598 that has IDC legs 1602.

Figure 19:
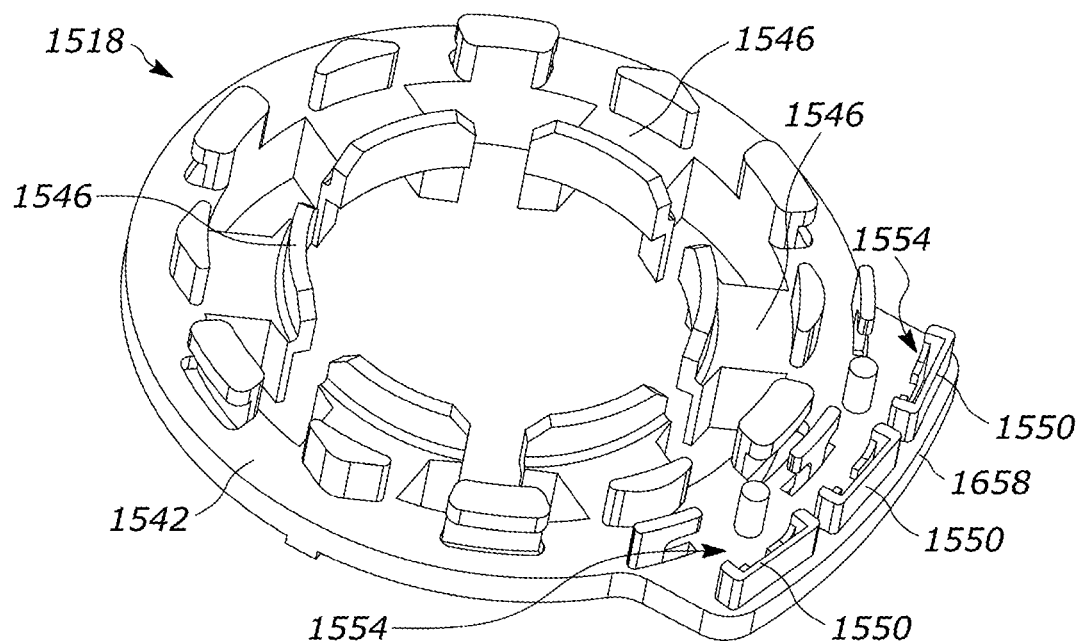
FIG. 19 is a perspective view of the stator insulator of FIG. 18A.

As illustrated in FIG. 19, the first stator insulator 1518 is formed of insulative material(s) (e.g., polypropylene or other insulative material(s)) to provide insulation for the motor stator windings 1506 of the electrical machine 1510. In some embodiments, the second stator insulator 1524 may be formed of the same material as the first stator insulator 1518. In other embodiments, the second stator insulator 1524 may be formed of a material that is different from the material of the first stator insulator 1518. The first stator insulator 1518 includes a ring structure 1542 and a plurality of insulator teeth 1546 (e.g., six teeth 1546) that are arranged concentrically around the ring structure 1542. The first stator insulator 1518 includes connector receivers 1550 that are disposed on or formed as part of an extension 1658 of the first stator insulator 1518. More specifically, the first stator insulator 1518 includes three connector receivers 1550 positioned on the extension 1658. The extension 1658 extends from the ring structure 1542 such that the extension 1658 extends away from an outer periphery of the stator 1502 when the electrical machine 1510 is assembled. As such, the connector receivers 1550 are positioned outside of the outer periphery of the stator 1502 when the electrical machine 1510 is assembled. The connector receivers 1550 may be substantially similar to the connector receivers 50 of FIG. 4. As such, the IDC 1598 of the electrical connectors 1522 may be secured in the connector receivers 1550 in a snap-fit arrangement, as described above.

When the electrical machine 1510 is assembled (e.g., in a power tool), the extension 1658 extends radially outward on a circumferential side of the ring structure 1542 and above the stator 1502 axially. Each electrical connector 1522 may be inserted into and secured in a corresponding slot 1554 of the respective connector receiver 1550 via a snap-fit arrangement to electrically connect the magnet wires to a printed circuit board assembly. To the extent that the magnet wires have an insulation layer in the portion extending from the motor stator windings 1506, the IDC 1598 of each electrical connector 1522 may pierce the insulation layer to electrically connect the electrical connector 1522 to the motor stator windings 1506. In some embodiments, a fuse wire from the printed circuit board assembly may be inserted between the pin legs 1586 of the electrical connector 1522 to electrically connect the electrical connector 1522 to the printed circuit board assembly. In some embodiments, a portion of the printed circuit board assembly may be positioned axially above the extension 1658 such that the pin 1582 couples to the portion of the printed circuit board assembly by snap-fit engagement to electrically couple the electrical connector 1522 to the printed circuit board assembly. As such, the connector 1522 may facilitate an electrical connection between the printed circuit board assembly and stator 1502 without soldering.

Figure 20A:
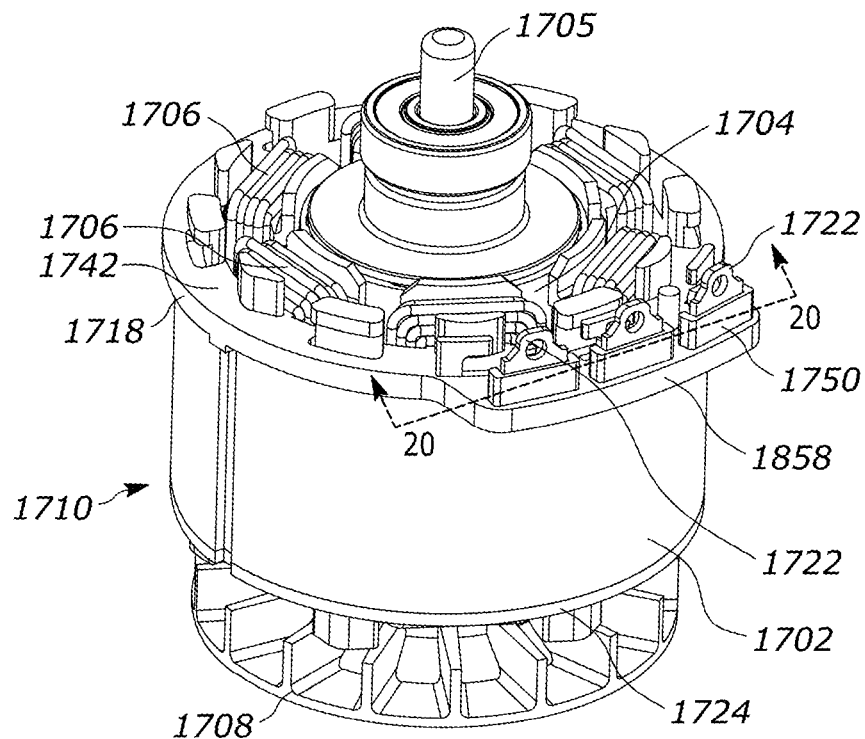
FIG. 20A is a perspective view of another exemplary electrical machine including connectors.
Figure 20B:
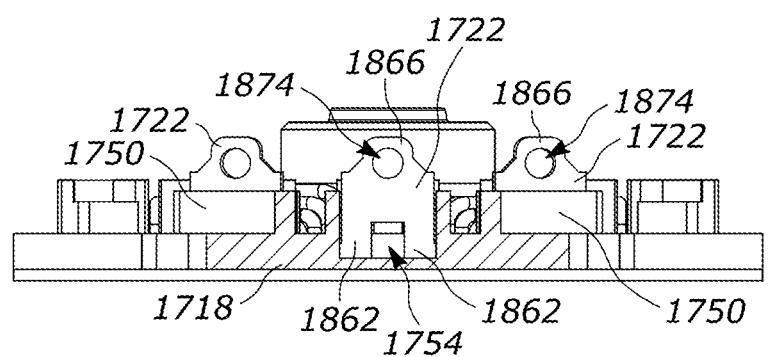
FIG. 20B is a section view of the electrical machine of FIG. 20A taken along line 20-20.

FIGS. 20A and 20B illustrate an electrical machine 1710 (e.g., a motor) according to another embodiment of the disclosure. The electrical machine 1710 is substantially similar to the electrical machine 10 of FIG. 1 except for the differences described herein. The electrical machine 1710 includes a stator 1702, a rotor 1704, a rotor shaft 1705, a plurality of motor stator windings 1706, and a fan 1708. The stator 1702, the rotor 1704, the rotor shaft 1705, the plurality of motor stator windings 1706, and the fan 1708 may be substantially similar, and in some instances, identical, to the stator 2, the rotor 4, the rotor shaft 5, the plurality of motor stator windings 6, and the fan 8 for the electrical machine 10 of FIG. 1. The electrical machine 1710 further includes a first stator insulator 1718, electrical connectors 1722, and a second stator insulator 1724. The first stator insulator 1718 is positioned on an end of the stator 1702, and the second stator insulator 1724 is positioned on another end of the stator 1702 that is opposite the first stator insulator 1718. The fan 1708 is disposed on the rotor shaft 1705 at a location such that the second stator insulator 1724 is positioned between the stator 1702 and the fan 1708.

Figure 21:
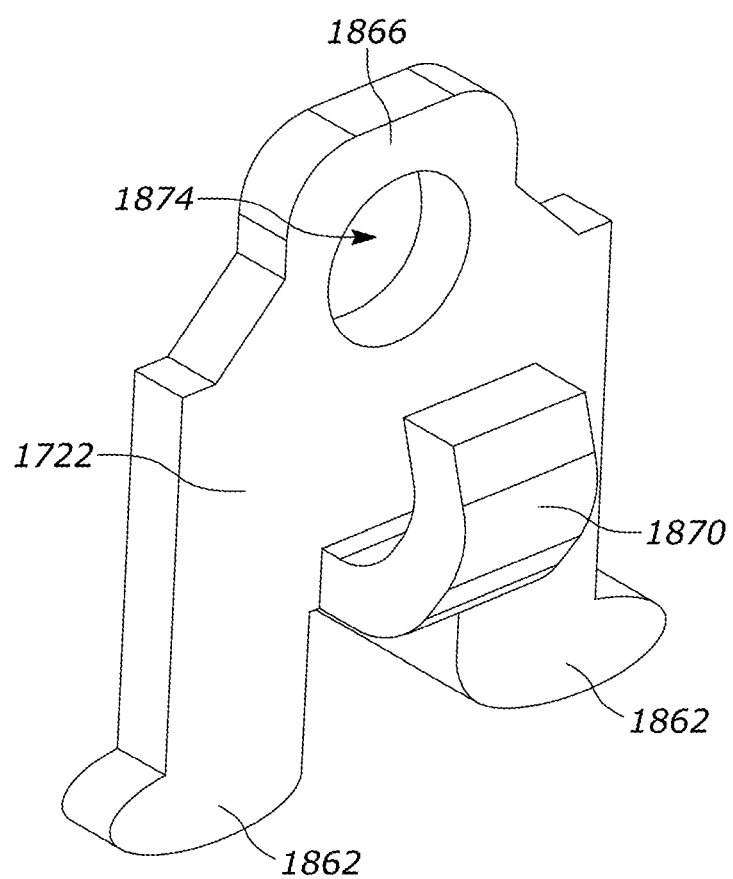
FIG. 21 is a perspective view of the connector of FIG. 20.

The first stator insulator 1718 is substantially similar to the first stator insulator 1518 of FIG. 18A and includes connector receivers 1750 positioned on an extension 1858. More specifically, the first stator insulator 1718 includes three connector receivers 1750 positioned on the extension 1858. The extension 1858 extends radially outward on a circumferential side of the ring structure 1742. The connector receivers 1750 are positioned exterior of an outer periphery or circumference of the stator 1702 and above the stator 1702 axially when the electrical machine 1710 is assembled. The connector receivers 1750 receive the electrical connectors 1722. As illustrated in FIGS. 20B and 21, the electrical connectors 1722 include legs 1862, a connector extension 1866, and a winding extension 1870. The legs 1862 are inserted into the connector receivers 1750 for facilitating a solderless mechanical connection. The solderless mechanical connection of the electrical connectors 1722 may improve ease of manufacturing and may also improve the ease with which electrical connectors 1722 may be replaced for the electrical machine. The legs 1862 may be snap-fit, press-fit, friction-fit, or attached to the connector receivers 1750 by another similar attaching means. The connector extension 1866 defines a fusing aperture 1874. The winding extension 1870 extends perpendicularly from the electrical connector 1722 and curves to become parallel with the electrical connector 1722 such that the electrical connector 1722 creates a hook-like shape.

When the electrical machine 1710 is assembled (e.g., in a power tool), the extension 1858 extends radially outward on a circumferential side of the ring structure 1742 and above the stator 1702 axially. Each electrical connector 1722 may be inserted into and secured in a corresponding slot 1754 of the respective connector receiver 1750. Magnet wires from the motor stator windings 1706 may be wound around and optionally soldered to the winding extension 1870 to electrically connect the electrical connector 1722 to the motor stator windings 1706. The fusing aperture 1874 may receive fuse wires from the printed circuit board assembly that are fused to the connector extension 1866 to electrically connect the magnet wires to the printed circuit board assembly through the electrical connector 1722. As such, the electrical connector 1722 may facilitate a semi-snap-fit arrangement in which the connector 1722 is mechanically connected to the stator insulator 1718 in a snap-fit arrangement, and the electrical connector 1722 includes soldering to facilitate an electrical connection between the printed circuit board assembly and the stator 1702 (or other electrical components).

It will be appreciated that each embodiment of the electrical connector 22, 222, 422, 622, 822, 1022, 1222, 1522, 1722 includes features that are not exclusive to each respective embodiment such that any feature disclosed with respect to each embodiment of the electrical connector 22, 222, 422, 622, 822, 1022, 1222, 1522, 1722 may be easily implemented with respect to another embodiment of the electrical connector 22, 222, 422, 622, 822, 1022, 1222, 1522, 1722. Additionally, each embodiment of the electrical connector 22, 222, 422, 622, 822, 1022, 1222, 1522, 1722 reduces and/or eliminates the need for soldered mechanical or electrical connections, thereby improving ease of manufacturability. Although the invention has been described in detail with reference to certain preferred embodiments, variations and modifications exist within the scope and spirit of one or more independent aspects of the invention as described.

As described above, some or all illustrated features may be omitted in a particular implementation within the scope of the present disclosure, and some illustrated features may not be required for implementation of all embodiments. The features described above may be implemented in an order different from the order described above and does not prohibit implementation in another order or combination. While not explained in detail for each embodiment and/or construction, the features of the disclosure described herein may be included on a tape dispenser independent of other features and are not limited to the illustrated disclosure. Embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof.

Various features and advantages of the invention are set forth in the following claims.

The invention claimed is:

1. A stator of an electrical machine comprising:
stator windings, each of the stator windings wound by magnet wire on a stator lamination core such that the stator has a plurality of magnet wires;
a stator insulator formed of an insulative material and having a ring structure, the stator insulator including connector receivers disposed adjacent the ring structure;
connectors each including legs such that each connector is coupled to a corresponding one of the connector receivers by snap-fit engagement between the legs and the corresponding one of the connector receivers adjacent distal ends of the legs via flex of the legs, each of the connectors configured to receive and electrically connect to one of the magnet wires of a corresponding one of the stator windings; and
a printed circuit board coupled to an input power line and electrically connected to each of the connectors such that the printed circuit board is electrically connected to the magnet wire of each of the stator windings.

2. The stator of claim 1, wherein the magnet wire is inserted between and engaged by the legs to electrically connect the connector to the magnet wire.

3. The stator of claim 2, wherein an inner surface of at least one of the legs is configured to pierce an insulation layer of the magnet wire to electrically connect the connector to one of the plurality of stator windings.

4. The stator of claim 2, wherein the legs include a first leg and a second leg, wherein, for each connector, an axis extends longitudinally along the connector between the first leg and the second leg, and wherein each of the first leg and the second leg is movable toward and away from the axis.

5. The stator of claim 1, wherein each of the connector receivers is formed on the ring structure.

6. The stator of claim 1, wherein the stator insulator includes an extension extending from a periphery of the ring structure, and wherein the extension is disposed radially outward from the ring structure and axially above the stator lamination core.

7. The stator of claim 6, wherein the extension includes the connector receivers.

8. The stator of claim 1, wherein an upper portion of each of the connectors is configured to receive another wire having a different diameter than diameters of the magnet wires.

9. The stator of claim 1, wherein the connectors further include a self-clinching mechanism at an end of each of the connectors opposite the legs, and wherein the self-clinching mechanism is configured to form a clinch connection between the connector and the printed circuit board in response to a force applied to a clinch end of the corresponding connector.

10. A connector for an electrical machine including a stator insulator and a printed circuit board, the connector comprising:
a body including a first end and a second end opposite the first end, an axis extending longitudinally between the first end and the second end;
a median portion located between the first end and the second end;
a first portion extending along the axis from the median portion toward the first end, the first portion configured to mechanically connect to the stator insulator and to electrically connect to a magnet wire of the electrical machine; and
a second portion extending along the axis from the median portion toward the second end, the second portion configured to mechanically and electrically connect to the printed circuit board, wherein the mechanical connection between the first portion and the stator insulator is by a first snap-fit engagement and the mechanical connection between the second portion and the printed circuit board is by a second snap-fit engagement.

11. The connector of claim 10, wherein the first portion includes first legs and the second portion includes second legs, and wherein each of first legs is movable toward and away from the axis and each of the second legs is movable toward and away from the axis.

12. The connector of claim 11, wherein the magnet wire has an insulation layer, and wherein each of the plurality of first legs is shaped to pierce the insulation layer to electrically connect to the magnet wire.

13. The connector of claim 10, wherein the first legs are spaced apart at the first end and the second legs are spaced apart at the second end.

14. A method for assembling an electrical machine, the electrical machine including stator windings, a stator insulator, connectors, and a printed circuit board, the stator insulator formed of an insulative material and including a ring structure and connector receivers, the method comprising:
coupling each of the connectors to a corresponding one of the connector receivers by inserting legs of each of the connectors into slots defined by the connector receivers, wherein the legs of each of the connectors extend along an axis,
wherein prior to full insertion into the connector receivers, the legs of the connectors flex toward the axis,
wherein on full insertion into the connector receivers, the legs of the connectors flex away from the axis and are secured in snap-fit engagement with the connector receivers.

15. The method of claim 14, further comprising inserting a magnet wire from each of the stator windings between the legs of a corresponding one of the connectors to electrically connect the stator windings to the connectors.

16. The method of claim 15, wherein the electrical machine further includes a printed circuit board having a plurality of slots, wherein the legs of the connector define first legs and the connector further includes second legs opposite from the first legs, the method further comprising coupling each of the connectors to a corresponding one of the plurality of slots by inserting the second legs of each of the connectors into the corresponding one of the plurality of slots,
wherein prior to full insertion into the corresponding one of the plurality of slots, the second legs of the connectors flex toward the axis,
wherein on full insertion into the corresponding one of the plurality of slots, the second legs of the connectors flex away from the axis and are secured in snap-fit engagement with the printed circuit board.

17. The method of claim 15, wherein the electrical machine further includes a printed circuit board having a plurality of slots, wherein the legs of the connector define first legs and the connector further includes second legs opposite the first legs, the method further comprising inserting a wire coupled to the printed circuit board between the second legs such that the second legs electrically connect to the printed circuit board.

18. The stator of claim 1, wherein the legs are biased outward to flex the legs into the snap-fit engagement with ledges of the stator insulator.

19. The stator of claim 1, wherein the legs are biased inward by initial engagement of the distal ends of the legs with the stator insulator.

20. The connector of claim 10, wherein the first portion includes first legs that are biased outward to flex the first legs into the first snap-fit engagement.

* * * * *